United States Patent
Kimura et al.

(10) Patent No.: US 10,570,274 B2
(45) Date of Patent: Feb. 25, 2020

(54) RUBBER COMPOSITION FOR TIRE AND STUDLESS TIRE

(71) Applicant: The Yokohama Rubber Co., LTD., Minato-ku, Tokyo (JP)

(72) Inventors: Kazushi Kimura, Hiratsuka (JP); Naoya Amino, Hiratsuka (JP); Masaki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 85 days.

(21) Appl. No.: 15/313,071

(22) PCT Filed: May 22, 2015

(86) PCT No.: PCT/JP2015/064781
§ 371 (c)(1),
(2) Date: Nov. 21, 2016

(87) PCT Pub. No.: WO2015/178485
PCT Pub. Date: Nov. 26, 2015

(65) Prior Publication Data
US 2017/0183483 A1    Jun. 29, 2017

(30) Foreign Application Priority Data

May 22, 2014 (JP) .................................. 2014-106356
May 22, 2015 (JP) .................................. 2014-106328

(51) Int. Cl.
C08L 7/00        (2006.01)
C08L 9/00        (2006.01)

(52) U.S. Cl.
CPC ........ *C08L 9/00* (2013.01); *C08L 7/00* (2013.01); *C08L 2312/00* (2013.01)

(58) Field of Classification Search
CPC ........ B60C 1/0016; C08K 3/04; C08K 5/548; C08K 7/02; C08L 7/00; C08L 9/00; C08L 2312/00
See application file for complete search history.

(56) References Cited

U.S. PATENT DOCUMENTS

| | | | | |
|---|---|---|---|---|
| 4,659,754 A * | 4/1987 | Edwards | .................... | C08J 3/22 523/214 |
| 5,098,771 A | 3/1992 | Friend | | |
| 6,550,508 B1 * | 4/2003 | Yamaguchi | ............. | B60C 11/00 152/167 |
| 9,493,637 B2 * | 11/2016 | Maejima | ................. | C08C 19/34 |
| 9,951,210 B2 * | 4/2018 | Kakubo | .................. | B60C 11/14 |
| 2002/0123564 A1 | 9/2002 | Obrecht et al. | | |
| 2002/0161119 A1 | 10/2002 | Obrecht et al. | | |
| 2002/0177661 A1 | 11/2002 | Obrecht et al. | | |
| 2013/0197131 A1 * | 8/2013 | Fujikura | .................. | C08K 7/02 524/9 |
| 2014/0066548 A1 | 3/2014 | Miyazaki | | |
| 2014/0100321 A1 | 4/2014 | Maejima et al. | | |

FOREIGN PATENT DOCUMENTS

| | | |
|---|---|---|
| DE | 100 39 749 | 2/2002 |
| DE | 100 52 287 | 4/2002 |
| DE | 100 61 543 | 6/2002 |
| DE | 11 2012 001 835 | 1/2014 |
| JP | H05-503723 | 6/1993 |
| JP | H07-278360 | 10/1995 |
| JP | 2009-051942 | 3/2009 |
| JP | 2013-010967 | 1/2013 |
| JP | 2013-022812 | 2/2013 |
| JP | 2013-194088 | 9/2013 |
| JP | 2013-204010 | 10/2013 |
| JP | 2014-047328 | 3/2014 |
| WO | WO 1991/01621 | 2/1991 |
| WO | WO 2002/14421 | 2/2002 |
| WO | WO 2002/32990 | 4/2002 |
| WO | WO 2002/48233 | 6/2002 |
| WO | WO-2011096399 A1 * | 8/2011 |
| WO | WO2012/144605 | 10/2012 |

OTHER PUBLICATIONS

International Search Report for International Application No. PCT/JP2015/064781 dated Aug. 25, 2015, 4 pages, Japan.

* cited by examiner

*Primary Examiner* — Irina S Zemel
*Assistant Examiner* — Jeffrey S Lenihan
(74) *Attorney, Agent, or Firm* — Thorpe North & Western

(57) ABSTRACT

A rubber composition for a tire contains: 100 parts by mass of a diene rubber (A); from 30 to 100 parts by mass of a filler (B); from 0.3 to 30 parts by mass of a crosslinkable component (C) that is not miscible with the diene rubber (A); and a fibrillated fiber (D). The fibrillated fiber (D) is dispersed in advance in the crosslinkable component (C) in a proportion of 0.1 to 10 mass % of the crosslinkable component (C), and the crosslinkable component (C) is a polyether-based, polyester-based, polyolefin-based, polycarbonate-based, aliphatic-based, saturated hydrocarbon-based, acrylic-based, or plant-derived polymer or copolymer.

22 Claims, 1 Drawing Sheet

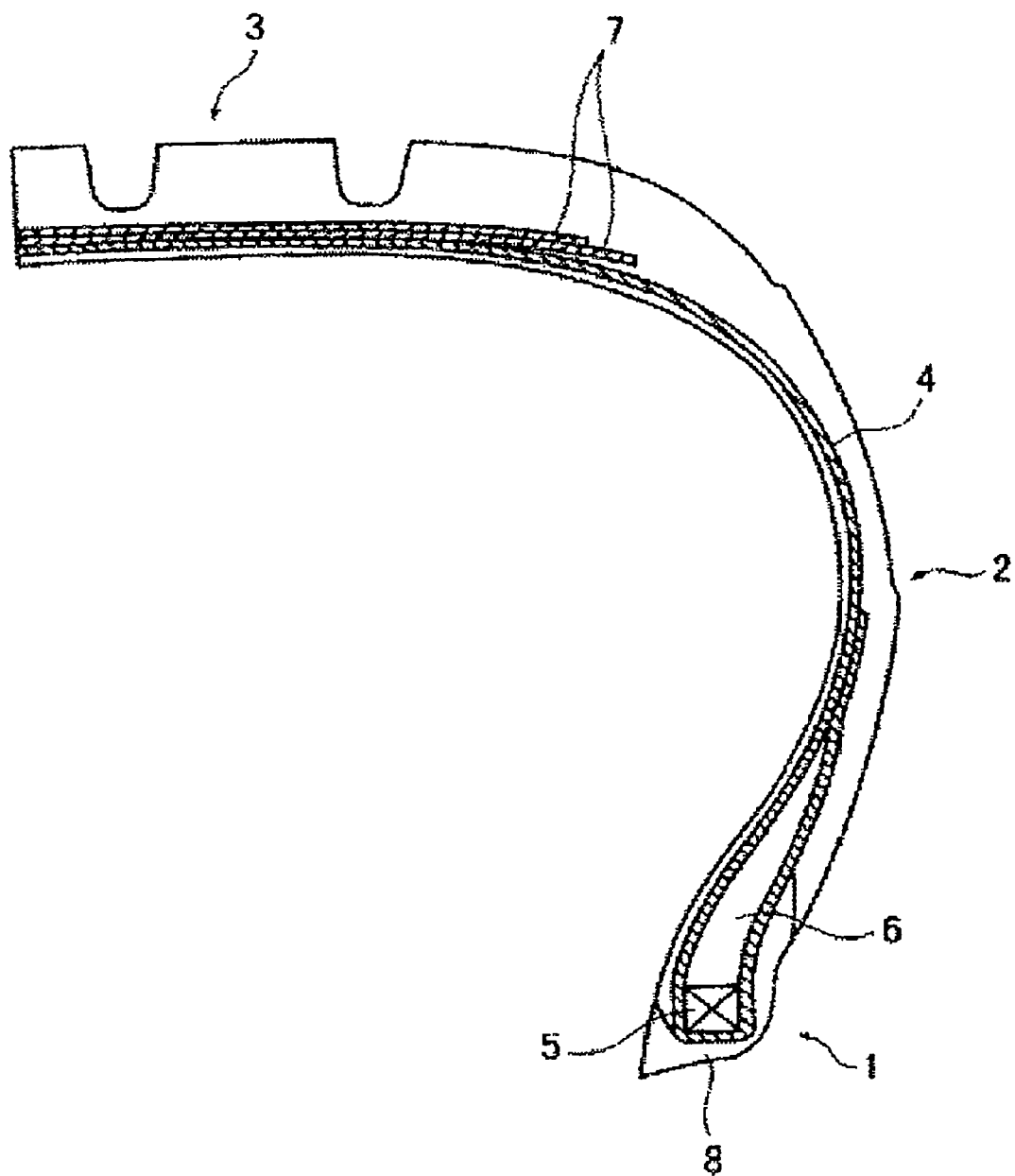

RUBBER COMPOSITION FOR TIRE AND STUDLESS TIRE

TECHNICAL FIELD

The present technology relates to a rubber composition for a tire and a studless tire.

BACKGROUND ART

To enhance friction performance on ice of studless tires, a rubber composition for a tire tread containing, per 100 parts by mass of a rubber component formed from a diene rubber, from 10 parts by mass to 50 parts by mass of a polymer gel, which is crosslinked rubber particles having an average particle diameter of 40 to 200 nm, and from 20 parts by mass to 40 parts by mass of powder formed from porous carbide of plant and having an average particle diameter of 10 to 500 μm has been proposed (see Japanese Unexamined Patent Application Publication No. 2009-51942A). However, in light of problems such that enhancement of the friction performance on ice is insufficient and the wear resistance is deteriorated, the inventors of the present technology have already proposed a composition containing a diene rubber as a main component, and a crosslinkable component formed from a crosslinkable oligomer or polymer that is not miscible with the diene rubber (see Japanese Unexamined Patent Application Publication No. 2013-010967A). According to this composition, the friction performance on ice and the wear resistance can be enhanced.

SUMMARY

In general, friction performance on ice becomes better as the rubber of a tire is softer; however, soft rubber for tires results in lower rigidity and lower wear resistance. In such circumstances, achieving both the friction performance on ice and the wear resistance at a high level is always demanded.

The present technology provides a rubber composition for a tire with excellent balance between the friction performance on ice and the wear resistance of the tire, and a studless tire.

The inventors of the present technology found that a tire achieving excellent balance between friction performance on ice and wear resistance can be obtained by using a rubber composition compounding, in a diene rubber, a particular type of crosslinkable component in which fibrillated fiber is dispersed in advance and which is not miscible with the diene rubber, and optionally compounded microparticles having a predetermined particle diameter, and thus completed the present technology. In particular, it was found that a tire having further enhanced friction performance on ice and wear resistance is obtained by using a rubber composition, in which the particular fibrillated fiber is dispersed in advance in the crosslinkable component and this is then compounded in the diene rubber, in a tread. That is, the present technology provides a rubber composition for a studless tire, which can produce a studless tire having excellent friction performance on ice and wear resistance, and a studless tire formed by using the rubber composition. Specifically, the present technology provides the following (1) to (26).

(1) A rubber composition for a tire containing:
100 parts by mass of a diene rubber (A);
from 30 to 100 parts by mass of a filler (B);
from 0.3 to 30 parts by mass of a crosslinkable component (C) that is not miscible with the diene rubber (A); and
a fibrillated fiber (D);
the fibrillated fiber (D) being dispersed in advance in the crosslinkable component (C) in a proportion of 0.1 to 10 mass % of the crosslinkable component (C); and
the crosslinkable component (C) being a polyether-based, polyester-based, polyolefin-based, polycarbonate-based, aliphatic-based, saturated hydrocarbon-based, acrylic-based, or plant-derived polymer or copolymer.

(2) The rubber composition for a tire according to (1) above, where the crosslinkable component (C) has at least one reactive functional group selected from the group consisting of a hydroxy group, silane functional group, isocyanate group, (meth)acryloyl group, allyl group, carboxy group, acid anhydride group, and epoxy group.

(3) The rubber composition for a tire according to (1) above, where the crosslinkable component (C) is a polyether-based polymer or copolymer having, in a molecule, at least one reactive functional group bonded by a covalent bond selected from the group consisting of an urethane bond, urea bond, amide bond, imino bond, ketone bond, and ester bond, and the reactive functional group is at least one functional group selected from the group consisting of a hydroxy group, silane functional group, isocyanate group, (meth)acryloyl group, allyl group, carboxy group, acid anhydride group, and epoxy group.

(4) The rubber composition for a tire according to (2) above, where the covalent bond is an urethane bond.

(5) The rubber composition for a tire according to any one of (1) to (4) above, where the crosslinkable component (C) contains an alkylene oxide monomer unit in a main chain.

(6) The rubber composition for a tire according to any one of (1) to (4) above, where the crosslinkable component (C) contains a propylene oxide monomer unit in a main chain.

(7) The rubber composition for a tire according to any one of (1) to (6) above, where the reactive functional group is a silane functional group or isocyanate group.

(8) The rubber composition for a tire according to any one of (1) to (7) above, where the rubber composition is formed by dispersing the fibrillated fiber (D) in the crosslinkable component (C) and then kneading the crosslinkable component (C) with the diene rubber (A) and the filler (B) in a condition that does not allow the reactive functional group of the crosslinkable component (C) containing the fibrillated fiber (D) to react.

(9) The rubber composition for a tire according to any one of (1) to (7) above, where the rubber composition is formed by dispersing the fibrillated fiber (D) in the crosslinkable component (C), allowing at least a part of the reactive functional group of the crosslinkable component (C) containing the fibrillated fiber (D) to react, and then kneading the crosslinkable component (C) with the diene rubber (A) and the filler (B).

(10) The rubber composition for a tire according to any one of (1) to (9) above, where the filler (B) is carbon black having a nitrogen adsorption specific surface area of 50 to 150 $m^2/g$ and/or a white filler having a CTAB (cetyl trimethylammonium bromide) adsorption specific surface area of 50 to 300 $m^2/g$.

(11) The rubber composition for a tire according to any one of (1) to (10) above, the rubber composition further containing from 1 to 15 parts by mass of thermally expanding microcapsules formed from thermoplastic resin particles containing a substance that vaporizes or expands to generate a gas by heat, per 100 parts by mass of the diene rubber (A).

(12) The rubber composition for a tire according to (1) above, the rubber composition further containing from 0.05 to 12 parts by mass of microparticles (E) that are three-dimensionally crosslinked and that have an average particle diameter of 0.1 to 100 μm, wherein the microparticles (E) are microparticles, in which an oligomer or polymer (e1) that is not miscible with the crosslinkable component (C) is three-dimensionally crosslinked.

(13) The rubber composition for a tire according to (12) above, where the oligomer or polymer (e1) is a polycarbonate-based, aliphatic-based, saturated hydrocarbon-based, acrylic-based, or plant-derived polymer or copolymer.

(14) The rubber composition for a tire according to (12) or (13) above, where the crosslinkable component (C) is a polyether-based, polyester-based, polyolefin-based, polycarbonate-based, aliphatic-based, saturated hydrocarbon-based, acrylic-based, or plant-derived polymer or copolymer.

(15) The rubber composition for a tire according to any one of (12) to (14) above, where the crosslinkable component (C) has at least one reactive functional group selected from the group consisting of a hydroxy group, silane functional group, isocyanate group, (meth)acryloyl group, allyl group, carboxy group, acid anhydride group, and epoxy group.

(16) The rubber composition for a tire according to any one of (12) to (15) above, where the oligomer or polymer (e1) is different from the reactive functional group contained in the crosslinkable component (C) and contains at least one reactive functional group selected from the group consisting of a hydroxy group, silane functional group, isocyanate group, (meth)acryloyl group, allyl group, carboxy group, acid anhydride group, and epoxy group that does not react with the reactive functional group contained in the crosslinkable component (C); and the microparticles (E) are microparticles formed by three-dimensionally crosslinking using the reactive functional group contained in the oligomer or polymer (e1) in the crosslinkable component (C).

(17) The rubber composition for a tire according to any one of (12) to (16) above, where the microparticles (E) are microparticles that are three-dimensionally crosslinked by reacting the oligomer or polymer (e1) with at least one type of component (e2) selected from the group consisting of water, a catalyst, and a compound having a functional group that reacts with the reactive functional group of the oligomer or polymer (e1).

(18) The rubber composition for a tire according to (17) above, where the compound (e2) is at least one compound selected from the group consisting of a hydroxy group-containing compound, silanol compound, hydrosilane compound, diisocyanate compound, amine compound, oxazolidine compound, enamine compound, and ketimine compound.

(19) The rubber composition for a tire according to any one of (12) to (18) above, where the rubber composition is formed by dispersing the microparticles (E), in which the oligomer or polymer (e1) is three-dimensionally crosslinked, and the fibrillated fiber (D) in the crosslinkable component (C) and then kneading the crosslinkable component (C) containing the microparticles (E) and the fibrillated fiber (D) with the diene rubber (A) and the filler (B) in a condition that does not allow the reactive functional group to react.

(20) The rubber composition for a tire according to any one of (12) to (18) above, where the rubber composition is formed by dispersing the microparticles (E), in which the oligomer or polymer (e1) is three-dimensionally crosslinked, and the fibrillated fiber (D) in the crosslinkable component (C), allowing at least a part of the reactive functional group of the crosslinkable component (C) containing the microparticles (E) and the fibrillated fiber (D) to react, and then kneading the crosslinkable component (C) with the diene rubber (A) and the filler (B).

(21) The rubber composition for a tire according to any one of (12) to (20) above, where the microparticles (E) are microparticles in which the oligomer or polymer (e1) that is not miscible with the crosslinkable component (C) is three-dimensionally crosslinked in advance in the crosslinkable component (C).

(22) The rubber composition for a tire according to any one of (12) to (21) above, where the diene rubber (A) contains 30 mass % or greater of at least one type of rubber selected from the group consisting of a natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), and derivatives of these rubbers.

(23) The rubber composition for a tire according to any one of (12) to (22) above, where an average particle diameter of the microparticles (E) is from 1 to 50 μm.

(24) The rubber composition for a tire according to any one of (1) to (23) above, where the fibrillated fiber (D) is at least one type selected from the group consisting of a natural fiber, synthetic fiber, plant-derived fiber, animal-derived fiber, and mineral-derived fiber, and has an average fiber length of 1 to 1,000 μm and an average fiber diameter of 0.01 to 1 μm.

(25) The rubber composition for a tire according to any one of (1) to (24) above, where an average glass transition temperature of the diene rubber (A) is −50° C. or lower.

(26) A studless tire having a tire tread portion formed from the rubber composition for a tire described in any one of (1) to (25) above.

According to the present technology, a rubber composition for a tire with excellent balance between the friction performance on ice and the wear resistance of the tire, and a studless tire can be obtained.

BRIEF DESCRIPTION OF DRAWING

The FIGURE is a schematic, partial cross-sectional view of a tire that represents an embodiment of the studless tire of the present technology.

DETAILED DESCRIPTION

Rubber Composition for Use in Tires

The rubber composition for a tire according to the present technology (hereinafter, also referred to as "rubber composition for a tire") contains: 100 parts by mass of a diene rubber (A); from 30 to 100 parts by mass of a filler (B); from 0.3 to 30 parts by mass of a crosslinkable component (C) that is not miscible with the diene rubber (A); and a fibrillated fiber (D);

the fibrillated fiber (D) being dispersed in advance in the crosslinkable component (C) in a proportion of 0.1 to 10 mass % of the crosslinkable component (C); and the crosslinkable component (C) being a polyether-based, polyester-based, polyolefin-based, polycarbonate-based, aliphatic-based, saturated hydrocarbon-based, acrylic-based, or plant-derived polymer or copolymer (also referred to as "basic structure of the rubber composition for a tire").

The rubber compositions for tires according to first to third embodiments described below all contains the basic structure of the rubber composition for a tire described above.

Rubber Composition 1 for Tire

The rubber composition for a tire according to the first embodiment of the present technology (hereinafter, also referred to as "rubber composition 1 for a tire"), in the basic structure of the rubber composition for a tire described above, contains the crosslinkable component (C) having at least one reactive functional group selected from the group consisting of a hydroxy group, silane functional group, isocyanate group, (meth)acryloyl group, allyl group, carboxy group, acid anhydride group, and epoxy group. The components contained in the rubber composition 1 for a tire will now be described in detail.

Diene Rubber (A)

The diene rubber (A) contained in the rubber composition for a tire is not particularly limited as long as the diene rubber (A) is a diene rubber having a double bond in the main chain. Specific examples thereof include a natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), and the like. One type of these diene rubbers can be used alone, or a combination of two or more types of these diene rubbers can be used.

Furthermore, the diene rubber (A) may be a derivative formed by modifying a terminal and/or side chain of the rubbers described above with an amino group, amide group, silyl group, alkoxy group, carboxy group, hydroxy group, epoxy group, and the like.

Among these, from the perspective of achieving even better friction performance on ice of a tire, use of an NR, BR and/or SBR is preferable, and a combined use of NR and BR is more preferable.

In the present technology, the average glass transition temperature of the diene rubber (A) is preferably −50° C. or lower from the perspectives of maintaining the hardness of the tire even at low temperatures (e.g. −1.5° C.) and achieving even better friction performance on ice of a tire.

Here, the glass transition temperature is the value determined at a temperature elevation speed of 10° C./min in accordance with ASTM D3418-82 using a differential scanning calorimeter (DSC) manufactured by DuPont.

The average glass transition temperature is the average value of the glass transition temperatures, and when only one type of diene rubber is used, refers to the glass transition temperature of that diene rubber, but, when a combination of two or more types of diene rubbers is used, refers to the glass transition temperature of the entire diene rubber (mixture of each diene rubber) and can be calculated as the average value from the glass transition temperature of each diene rubber and the compounding ratio of each diene rubber.

Furthermore, in the present technology, from the perspective of achieving excellent strength of a tire, preferably 20 mass % or greater, and more preferably 40 mass % or greater, of the diene rubber (A) is an NR.

Filler (B)

The rubber composition for a tire of the present technology contains a filler (B).

Specifically, the filler (B) is formed from carbon black, a white filler, or a combination of these.

Carbon Black

Specific examples of the carbon black are furnace carbon black such as SAF (super abrasion furnace), ISAF (intermediate super abrasion furnace), HAF (high abrasion furnace), FEF (fast extruding furnace), GPE (general purpose furnace), and SRF (semi-reinforcing furnace), and one of these can be used alone, or a combination of two or more can be used.

In the carbon black, from the perspective of processability during mixing of the rubber composition, reinforcing property of a tire, and the like, the nitrogen adsorption specific surface area ($N_2SA$) is preferably from 10 to 300 $m^2/g$, and more preferably from 20 to 200 $m^2/g$, and from the perspectives of enhancing wear resistance of the tire and achieving excellent friction performance on ice, the nitrogen adsorption specific surface area is preferably from 50 to 150 $m^2/g$, and more preferably from 70 to 130 $m^2/g$.

Note that the $N_2SA$ is a value of the amount of nitrogen adsorbed to a surface of carbon black, measured in accordance with JIS (Japanese Industrial Standard) K6217-2:2001, "Part 2: Determination of specific surface area—Nitrogen adsorption methods—Single-point procedures".

White Filler

The white filler is a filler other than carbon black. Specific examples of the white filler include silica, calcium carbonate, magnesium carbonate, talc, clay, alumina, aluminum hydroxide, titanium oxide, calcium sulfate, and the like. One type of these can be used alone, or a combination of two or more types of these can be used.

Among these, silica is preferable from the perspective of achieving even better friction performance on ice of a tire.

Specific examples of the silica include wet silica (hydrous silicic acid), dry silica (silicic anhydride), calcium silicate, aluminum silicate, and the like. One type of these can be used alone, or a combination of two or more types of these can be used.

Among these, wet silica is preferable from the perspectives of achieving even better friction performance on ice of a tire and further enhancing wear resistance.

In the silica, the CTAB adsorption specific surface area is preferably from 50 to 300 $m^2/g$, more preferably from 70 to 250 $m^2/g$, and even more preferably from 90 to 200 $m^2/g$ from the perspective of achieving excellent wear resistance of a tire.

Note that the CTAB adsorption specific surface area is a value of the amount of n-hexadecyltrimethylammonium bromide adsorbed to the surface of silica measured in accordance with JIS K6217-3:2001 "Part 3: Method for determining specific surface area—CTAB adsorption method."

In the present technology, the content of the filler (B) is, in terms of the total amount of the carbon black and the white filler, from 30 to 100 parts by mass, preferably from 40 to 90 parts by mass, and even more preferably from 45 to 80 parts by mass, per 100 parts by mass of the diene rubber (A).

Furthermore, when the carbon black and the white filler are used in combination, the content of the white filler is preferably from 5 to 85 parts by mass, and more preferably from 15 to 75 parts by mass, per 100 parts by mass of the diene rubber (A).

Crosslinkable Component (C)

The crosslinkable component (C) is specifically an oligomer that is not miscible with the diene rubber and that is crosslinkable or a polymer that is not miscible with the diene rubber and that is crosslinkable, is a particular polymer or copolymer, and has a particular reactive functional group.

Note that "not miscible (with the diene rubber)" does not indicate the condition of being not miscible with all the rubber components that could be used as the diene rubber (A) but indicates the condition where components of a specific combination of the diene rubber (A) and the crosslinkable component (C) contained in the rubber component for a tire are not miscible with each other.

The particular polymer or copolymer is a polyether-based, polyester-based, polyolefin-based, polycarbonate-based, aliphatic-based, saturated hydrocarbon-based, acrylic-based, or plant-derived polymer or copolymer.

Examples of the polyether-based polymer or copolymer include polyethylene glycol, polypropylene glycol (PPG), polypropylene triol, ethylene oxide/propylene oxide copolymers, polytetramethylene ether glycol (PTMEG), sorbitol-based polyol, and the like.

Furthermore, examples of the polyester-based polymer or copolymer include condensation products of low molecular weight polyhydric alcohols (e.g. ethylene glycol, diethylene glycol, propylene glycol, and the like) and polybasic carboxylic acids (e.g. adipic acid, sebacic acid, terephthalic acid, isophthalic acid, and the like) (condensed polyester polyol); lactone-based polyols; and the like.

Furthermore, examples of the polyolefin-based polymer or copolymer include polyethylene, polypropylene, ethylene propylene copolymers (EPR, EPDM), polybutylene, polyisobutylene, hydrogenated polybutadiene, and the like.

Furthermore, examples of the polycarbonate-based polymer or copolymer include substances obtained by transesterification reaction of polyol compounds (e.g. 1,6-hexanediol, 1,4-butanediol, 1,5-pentanediol, and the like) and dialkyl carbonates, and the like.

Furthermore, examples of the acrylic-based polymer or copolymer include acrylic polyols; homopolymers of acrylates, such as acrylate, methyl acrylate, ethyl acrylate, butyl acrylate, and 2-ethylhexyl acrylate; acrylate copolymers formed by combining two or more types of these acrylates; and the like.

Furthermore, examples of the plant-derived polymer or copolymer include plant oils and fats, such as castor oil and soybean oil; various elastomers derived from polyester polyol or the like formed by modifying polylactic acid or the like; and the like.

The particular reactive functional group is at least one reactive functional group selected from the group consisting of a hydroxy group, silane functional group, isocyanate group, (meth)acryloyl group, allyl group, carboxy group, acid anhydride group, and epoxy group. The crosslinkable component (C) having such a particular reactive functional group makes friction performance on ice of a tire even better by undergoing crosslinking between molecules.

Note that the silane functional group is also referred to as a crosslinkable silyl group. Specific examples thereof include a hydrolyzable silyl group; silanol group; functional groups in which a silanol group is substituted with an acetoxy group derivative, enoxy group derivative, oxime group derivative, amine group derivative, or the like; and the like.

Among these functional groups, from the perspectives of appropriately crosslinking the crosslinkable component (C) during processing of the rubber, and achieving even better friction performance on ice of a tire and even better wear resistance, a silane functional group, isocyanate group, acid anhydride group, or epoxy group is preferably contained. In particular, a hydrolyzable silyl group or isocyanate group is more preferably contained.

Note that specific examples of the hydrolyzable silyl group include alkoxysilyl groups, alkenyloxysilyl groups, acyloxysilyl groups, aminosilyl groups, aminoxysilyl groups, oximesilyl groups, amidosilyl groups, and the like.

Among these, from the perspective of achieving excellent balance between hydrolyzability and storage stability, an alkoxysilyl group is preferable. Specifically, an alkoxysilyl group represented by Formula (1) below is more preferable, and a methoxysilyl group or ethoxysilyl group is even more preferable.

[Chemical Formula 1]

(1)

In the formula, $R^1$ represents an alkyl group having from 1 to 4 carbons, $R^2$ represents a hydrogen atom or an alkyl group having from 1 to 4 carbons, and a represents an integer of 1 to 3. When a is 2 or 3, the plurality of $R^1$ may be the same or different. When a is 1, the plurality of $R^2$ may be the same or different.

Furthermore, the isocyanate group described above is an isocyanate group remained after reacting a hydroxy group of a polyol compound (e.g. polycarbonate-based polyol, or the like) with an isocyanate group of a polyisocyanate compound.

Note that the polyisocyanate compound is not particularly limited as long as the polyisocyanate compound contains two or more isocyanate groups in a molecule. Specific examples thereof include aromatic polyisocyanates, such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates, such as hexamethylene diisocyanate (HDI), trimethylhexamethylene diisocyanate (TMHDI), lysine diisocyanate, and norbornane diisocyanate (NBDI); alicyclic polyisocyanates, such as transcyclohexane-1,4-diisocyanate, isophorone diisocyanate (IPDI), bis(isocyanate methyl)cyclohexane (H6XDI), and dicyclohexylmethane diisocyanate ($H_{12}MDI$); carbodiimide-modified polyisocyanates of these; isocyanurate-modified polyisocyanates of these; and the like.

Note that, in the present technology, when the crosslinkable component (C) having a hydroxy group is used as a reactive functional group, it is preferable to crosslink a part or all of the crosslinkable component (C) using an isocyanate compound or the like in advance before blending with the diene rubber (A), or to blend a crosslinking agent, such as an isocyanate compound, in the rubber in advance.

In the present technology, the reactive functional group is preferably contained at least at a terminal of the main chain of the crosslinkable component (C), and when the main chain is a straight chain, 1.5 or more reactive functional groups are preferably contained, and 2 or more reactive functional groups are more preferably contained. On the other hand, when the main chain is branched, 3 or more reactive functional groups are preferably contained.

Furthermore, in the present technology, from the perspective of achieving excellent dispersibility with the diene rubber (A) and/or kneading processability of the rubber composition, the weight average molecular weight or number average molecular weight of the crosslinkable component (C) is preferably from 300 to 30,000, and more preferably from 500 to 25,000.

Note that the weight average molecular weight and number average molecular weight are both measured by gel permeation chromatography (GPC) based on calibration with standard polystyrene.

Furthermore, in the present technology, the content of the crosslinkable component (C) is from 0.3 to 30 parts by mass, preferably from 0.5 to 25 parts by mass, and more preferably from 1 to 15 parts by mass, per 100 parts by mass of the diene rubber (A).

Silane Coupling Agent

When the rubber composition 1 for a tire of the present technology contains the white filler (especially, silica) described above, the rubber composition 1 preferably contains a silane coupling agent from the perspective of enhancing reinforcing performance of a tire.

When the silane coupling agent is compounded, the content thereof is preferably from 0.1 to 20 parts by mass, and more preferably from 4 to 12 parts by mass, per 100 parts by mass of the white filler.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Of these examples, to improve the reinforcing properties of the tire, bis(3-triethoxysilylpropyl)tetrasulfide and/or bis(3-triethoxysilylpropyl)disulfide is preferably used. Specific examples thereof include Si69 (bis(3-triethoxysilylpropyl)tetrasulfide, manufactured by Evonik Degussa), Si75 (bis(3-triethoxysilylpropyl)disulfide, manufactured by Evonik Degussa), and the like.

Fibrillated Fiber (D)

The rubber composition for a tire contains fibrillated fiber (D).

The material of the fibrillated fiber (D) is not particularly limited, and examples thereof include at least one type selected from the group consisting of a natural fiber, synthetic fiber, plant-derived fiber, animal-derived fiber, and mineral-derived fiber.

Examples of the natural fiber include fibers of cotton, hemp, or the like; and fibers of asbestos, basalt, or the like.

Examples of the synthetic fiber include organic synthetic fibers of polyamide, polyurethane, polyester, polyolefin, or the like; and semi-synthetic fibers of acetate, triacetate, or the like.

As the plant-derived fiber, from the perspective of facilitating preparation of the fibrillated fiber having a short fiber length, cellulose fibers or pulp fibers (in the description hereinafter, these are collectively referred to as "cellulose fiber") are preferably used. Examples of the cellulose fiber include natural cellulose fibers (pulp fibers), such as wood fiber and seed hair fiber; chemically synthesized cellulose fibers, such as organic acid esters, inorganic acid esters, mixed acid esters, hydroxyalkyl cellulose, carboxyalkyl cellulose, alkyl cellulose, and regenerated cellulose. Furthermore, examples of the cellulose fiber include microfibril cellulose fibers and cellulose nanofibers obtained by fibrillating or extracting conventional pulp fibers by various methods; regenerated cellulose, such as polylactic acid (PLA) fibers formed from dextrose derived from corn; polyester fibers derived from biofuel; and the like.

Examples of the animal-derived fiber include fibers of chitin, chitosan, collagen, or the like; animal hairs, such as wool and mohair; fibers of silk or the like.

Examples of the mineral-derived fiber include fibers of ceramics, glass, metal, carbon, or the like.

Among these fibers, synthetic fibers, plant-derived fibers, and animal-derived fibers are preferably used. From the perspective of ease of procurement and handleability, for example, aramid fiber is more preferably used among the synthetic fibers, cellulose fiber is more preferably used among the plant-derived fibers, and chitin fiber is preferably used among the animal-derived fibers. Furthermore, from the perspective of reducing the environmental burden, plant-derived fibers such as cellulose fiber and animal-derived fibers such as chitin fiber are preferably used.

Examples of commercially available product of cellulose fiber include cellulose nanofibers (microfibrous cellulose), such as BiNFi-s cellulose 2 (manufactured by Sugino Machine Ltd.), Celish KY100S (manufactured by Daicel FineChem Ltd.), Celish KY100G (manufactured by Daicel FineChem Ltd.), and Celish KY110N (manufactured by Daicel FineChem Ltd.).

Examples of commercially available product of chitin fiber include chitin nanofibers (microfibrous chitin), such as BiNFi-s chitin 2 (manufactured by Sugino Machine Ltd.).

Examples of commercially available product of aramid fiber include microfibrillated fibers (microfibrous aramid fiber) of aramid fibers, such as Tiara KY400S (manufactured by Daicel FineChem Ltd.) and para-aromatic polyamide short fiber (Kevlar ES, manufactured by DuPont-Toray Co., Ltd.).

As the fibrillated fiber (D), one type of these fibers described above can be used alone, or a combination of two or more types of these can be used.

Significance of use of the fibrillated fiber (D) together with the crosslinkable component (C) in the rubber composition for a tire will be described.

Conventionally, blending of fibrous substances, such as short fibers, microfibrils, and nanofibers, in a rubber component has been proposed. Japanese Unexamined Patent Application Publication No. 2002-114868A and Japanese Unexamined Patent Application Publication No. 2003-192843A propose a rubber composition for a studless tire which removes water film between tread rubber and road surface by compounding inorganic short fiber; however, these publications pose a problem in that the adhesive effect is reduced by the reduction in ground contact area between the rubber and icy surface due to rough tread surface caused by traveling, and thus limit ranges of the diameter of the short fiber or the fiber length considerably. Furthermore, recently, compounding of a fiber called microfibrillated plant fiber in a rubber component has been proposed. Although the effect of enhancing physical properties of the rubber and the like have been reported, it is extremely difficult to achieve well-dispersed condition of the microfibrillated plant fiber in the rubber composition. Therefore, blending of a combination of the microfibrillated plant fiber with a phenolic resin in Japanese Unexamined Patent Application Publication No. 2013-151586A, with an industrial lignin in Japanese Unexamined Patent Application Publication No. 2013-155303A, with a natural ceramic resin in Japanese Unexamined Patent Application Publication No. 2013-155304A, or with a biopolymer in Japanese Unexamined Patent Application Publication No. 2013-194088A have been proposed.

Furthermore, an attempt to enhance dispersibility with the rubber component by subjecting the microfibrillated plant fiber to surface treatment has also been proposed. Japanese Unexamined Patent Application Publication No. 2009-084564A proposes an attempt to perform chemical modification such as acetylation, Japanese Unexamined Patent Application Publication No. 2011-231204A proposes performing aminosilane treatment, and Japanese Unexamined Patent Application Publication No. 2011-231205A proposes an attempt to perform sulfur containing-silane treatment.

In addition, Japanese Unexamined Patent Application Publication No. 2009-191197A proposes use of an acrylamide-based dispersing agent for cellulose nanofiber, Japanese Unexamined Patent Application Publication No. 2010-254925A proposes a method that uses an isocyanate-vinyl compound, and Japanese Unexamined Patent Application Publication No. 2009-263417A proposes enhancement of dispersibility by grafting via living radical polymerization.

All of these are attempts to uniformly disperse hydrophilic nanofiber, which is derived from natural products and is forming a significantly firm aggregation structure, in a hydrophobic rubber, such as a natural rubber and synthetic rubber; however, it has been extremely difficult to sufficiently exhibit the effect originated in nanofiber, such as stiffening of rubber physical properties.

Meanwhile, the present applicant has proposed to compound, in a diene rubber, a crosslinkable oligomer or polymer that is not miscible with the diene rubber as a method to drastically enhance friction performance on ice while wear resistance is maintained. In this method, the immiscible crosslinkable oligomer or polymer undergoes phase separation due to the immiscibility during vulcanization of the diene rubber and forms a crosslinked body due to its crosslinkability; however, the present applicant is further proposing a method in which, after this crosslinkable oligomer or polymer is crosslinked in advance, a diene polymer is mixed thereto and then vulcanized. In both methods, this crosslinkable oligomer or polymer is dispersed within the diene rubber in a form that is phase-separated from the main component.

As a result of diligent research to further enhance the friction performance on ice and the wear resistance, the inventors of the present technology have found that the friction performance on ice and the wear resistance are drastically enhanced by dispersing in advance fibrillated fiber in a crosslinkable oligomer or polymer that is not miscible with the diene rubber, then preferably causing phase separation during vulcanization of the diene rubber utilizing the immiscibility, and forming a fibrillated fiber-containing crosslinked body by its crosslinkability, or alternatively, by crosslinking in advance a crosslinkable oligomer or polymer containing fibrillated fiber, then mixing this with a diene polymer, and vulcanizing the diene rubber thereby allowing the fibrillated fiber, which is dispersed in the crosslinked body that is not the diene rubber, to be contained within the crosslinked body. In the present embodiment, as described above, since the fibrillated fiber is contained in the diene rubber in a condition that the fibrillated fiber is dispersed in the crosslinkable component, the present embodiment is different from rubber compositions in which a fibrous substance is directly dispersed within a diene rubber of the publications listed above.

In particular, when the crosslinkable oligomer or polymer is a polyether-based, polyester-based, polyolefin-based, polycarbonate-based, aliphatic-based, saturated hydrocarbon-based, acrylic-based, or plant-derived polymer or copolymer, which are usually not used as raw materials for tires, these exhibit excellent dispersibility (blendability) of fibrillated fiber, especially plant-derived microfibrillated plant fiber, compared to diene rubbers.

Furthermore, in the present embodiment, since the fibrillated fiber is contained in the diene rubber in the condition that the fibrillated fiber is dispersed in the crosslinkable component, the effect of enhancing friction performance on ice by the crosslinkable component is synergistically enhanced, and a rubber composition for a tire having an excellent balance between the friction performance on ice and the wear resistance of the tire can be obtained.

Going back to the description of the fibrillated fiber (D), the fibrillated fiber (D) preferably has an average fiber length of 1 to 1,000 µm and an average fiber diameter of 0.01 to 1 µm.

By setting the average fiber length to 1 µm or greater, the significant effect of enhancing friction performance on ice of a tire can be achieved. Furthermore, by setting the average fiber length to 1,000 µm or shorter, tangling of the fibers can be suppressed, excellent dispersibility in the crosslinkable component (C) can be achieved, and the shape and size of the crosslinkable component (C) can be made uniform. The average fiber length of the fibrillated fiber (D) is more preferably from 5 to 500 µm.

Furthermore, when the average fiber diameter is smaller than 0.01 µm, it is difficult to produce the fibrillated fiber and to well-disperse the ultra fine fibrillated fiber. Furthermore, by setting the average fiber diameter to 1 µm or smaller, aggregation of the fibers is suppressed when the fiber is dispersed in the crosslinkable component (C), and the crosslinkable component (C) can maintain suitable elasticity.

The average fiber diameter and the average fiber length of the fibrillated fiber (D) can be measured by image analysis of scanning electron micrograph, image analysis of transmission electron micrograph, analysis of X-ray scattering data, and pore electrical resistance method (the Coulter principle method), or the like.

The method of producing the fibrillated fiber (D) having the average fiber length and the average fiber diameter described above is not particularly limited, and an example thereof is mechanically performing crushing treatment after pulp is subjected to acid treatment when the fibrillated fiber (D) is a plant-derived fiber. The method of pulping a plant raw material is not particularly limited, and examples thereof include a mechanical pulp method by which the plant raw material is mechanically pulped, and the like.

The aspect ratio (average fiber length/average fiber diameter) of the fibrillated fiber (D) is not particularly limited; however, the aspect ratio is preferably from 1 to 100,000, and more preferably from 50 to 10,000.

In the tire composition, the fibrillated fiber (D) is contained in a proportion of 0.1 to 10 mass % of the crosslinkable component (C). When the proportion is less than 0.1 mass %, the effect of enhancing friction performance on ice of a tire cannot be achieved sufficiently. Furthermore, when the proportion is greater than 10 mass %, the fibrillated fiber (D) cannot be well-dispersed in the crosslinkable component (C), thereby impairing processability of the tire and making it difficult to achieve both excellent friction performance on ice and wear resistance at the same time. By compounding the fibrillated fiber (D) in a proportion of 0.1 to 10 mass % of the crosslinkable component (C), the particle diameter of the crosslinkable component (C) containing the fibrillated fiber (D) becomes uniform in the diene rubber component (A). It is conceived that the effect of enhancing friction performance on ice is achieved due to this. The content of the fibrillated fiber (D) is more preferably from 0.1 to 5 mass % relative to the amount of the crosslinkable component (C). Furthermore, the fibrillated fiber (D) is contained by dispersing the fibrillated fiber (D) in advance in the crosslinkable component (C). As a result, the friction performance on ice and wear resistance are further enhanced. By compounding the fibrillated fiber (D) in a manner that the fibrillated fiber (D) is dispersed in advance in the crosslinkable component (C) as described above, the fibrillated fiber (D) is dispersed in the diene rubber (A) in an amount of 5 mass % or less of the compounded amount of the fibrillated fiber (D), and basically, the fibrillated fiber (D) is not dispersed in the diene rubber (A) (basically, the fibrillated fiber (D) is dispersed in the crosslinkable component (C)). Note that the case where the fibrillated fiber (D) is basically dispersed in the crosslinkable component (C) also includes the case where a part of the fibrillated fiber (D) exists in the crosslinkable component (C) while another part of the fibrillated fiber (D) exists in the diene rubber (A).

Thermally Expanding Microcapsule

From the perspective of achieving even better friction performance on ice of a tire, the rubber composition 1 for a tire of the present technology preferably contains thermally expanding microcapsules formed from thermoplastic resin particles containing a substance that vaporizes or expands to generate a gas by heat.

Note that the thermally expanding microcapsules release, as a gas, the substance that is sealed inside the outer shell formed from the thermoplastic resin by heating at a temperature (e.g. 140 to 190° C., preferably 150 to 180° C.) that is equal to or higher than the initiation temperature of vaporization or expansion of the substance.

Furthermore, although the particle diameter of the thermally expanding microcapsules is not particularly limited, the particle diameter is preferably from 5 to 300 μm, and more preferably from 10 to 200 μm, before the expansion.

Such thermally expanding microcapsules are available as, for example, trade names "Expancel 091DU-80" and "Expancel 092DU-120" manufactured by Expancel in Sweden, trade names "Matsumoto Microsphere F-85" and "Matsumoto Microsphere F-100" manufactured by Matsumoto Yushi-Seiyaku Co., Ltd.

In the present technology, the shell material of the thermally expanding microcapsule is composed of a thermoplastic resin formed by polymerizing a nitrile-based monomer (I) which is a monomer used as the main component, a monomer (II) having an unsaturated double bond and a carboxyl group in a molecule, a monomer (III) having at least two polymerizable double bonds, and, as necessary, a monomer (IV) that is copolymerizable with the monomers described above to adjust the expansion characteristics.

Specific examples of the nitrile-based monomer (I) include acrylonitrile, methacrylonitrile, α-chloroacrylonitrile, α-ethoxyacrylonitrile, fumaronitrile, mixtures of these, and the like.

Among these, acrylonitrile and/or methacrylonitrile is preferable.

Furthermore, the copolymer ratio of the nitrile-based monomer (I) is preferably from 35 to 95 mass %, and more preferably from 45 to 90 mass %.

Specific examples of the monomer (II) having an unsaturated double bond and a carboxyl group in a molecule include acrylic acid (AA), methacrylic acid (MAA), itaconic acid, styrenesulfonic acid or sodium salts, maleic acid, fumaric acid, citraconic acid, mixtures of these, and the like.

The copolymer ratio of the monomer (II) is preferably from 4 to 60 mass %, and more preferably from 10 to 50 mass %. When the copolymer ratio of the monomer (II) is 4 mass % or higher, expansibility can be sufficiently maintained even at a high temperature region.

Specific examples of the monomer (III) having at least two polymerizable double bonds include aromatic divinyl compounds (e.g. divinylbenzene, divinylnaphthalene, and the like), allyl methacrylate, triacrylformal, triallyl isocyanate, ethylene glycol di(meth)acrylate, diethylene glycol di(meth)acrylate, tri ethylene glycol di(meth)acrylate, 1,4-butanediol di(meth)acrylate, 1,9-nonanediol di(meth)acrylate, polyethylene glycol (PEG #200) di(meth)acrylate having a weight average molecular weight of 200, polyethylene glycol (PEG #400) di(meth)acrylate having a weight average molecular weight of 400, 1,6-hexanediol (meth)acrylate, trimethylolpropane trimethacrylate, mixtures of these, and the like.

The copolymer ratio of the monomer (III) is preferably from 0.05 to 5 mass %, and more preferably from 0.2 to 3 mass %. When the copolymer ratio of the monomer (III) is within this range, expansibility can be sufficiently maintained even at a high temperature region.

Specific examples of the monomer (IV) that is copolymerizable and that can be used as necessary include (meth)acrylates, such as vinylidene chloride, vinyl acetate, methyl (meth)acrylate, ethyl (meth)acrylate, n-butyl (meth)acrylate, isobutyl (meth)acrylate, and t-butyl (meth)acrylate, styrene, styrenesulfonic acid or sodium salts thereof, styrene-based monomers, such as α-methyl styrene and chlorostyrene, acrylamide, substituted acrylamide, methacrylamide, substituted methacrylamide, and the like.

The monomer (IV) is an optional component, and when the monomer (IV) is added, the copolymer ratio thereof is preferably from 0.05 to 20 mass %, and more preferably from 1 to 15 mass %.

Specific examples of the substance that generates a gas when vaporized by heat that is contained in the thermally expanding microcapsules include liquids such as hydrocarbons, such as n-pentane, isopentane, neopentane, butane, isobutane, hexane, and petroleum ether; and chlorinated hydrocarbons, such as methyl chloride, methylene chloride, dichloroethylene, trichloroethane, and trichloroethylene; or solids such as azodicarbonamide, dinitrosopentamethylenetetramine, azobisisobutyronitrile, toluenesulfonyl hydrazide derivatives, and aromatic succinyl hydrazide derivatives.

In the present technology, the content of the thermally expanding microcapsules is preferably from 1 to 15 parts by mass, and more preferably from 1 to 10 parts by mass, per 100 parts by mass of the diene rubber (A).

Other Components

The rubber composition for a tire of the present technology may contain, beside the components described above, various other additives typically used in rubber compositions for tires including a vulcanizing agent such as sulfur; a sulfenamide-based, guanidine-based, thiazole-based, thiourea-based, or thiuram-based vulcanization accelerator; a vulcanization accelerator aid, such as zinc oxide and stearic acid; wax; aroma oil, an anti-aging agent; a plasticizer; and the like.

The compounded amount of these additives may be any conventional amount, as long as the performance of the present technology is not impaired. For example, per 100 parts by mass of the diene rubber (A), from 0.5 to 5 parts by mass of sulfur, from 0.1 to 5 parts by mass of a vulcanization accelerator, from 0.1 to 10 parts by mass of a vulcanization accelerator aid, from 0.5 to 5 parts by mass of an anti-aging agent, from 1 to 10 parts by mass of a wax, and from 5 to 30 parts by mass of an aroma oil may be compounded.

Method of Producing Rubber Composition 1 for Tire

The method of producing the rubber composition 1 for a tire of the present technology comprises a first step which disperses the fibrillated fiber (D) in the crosslinkable component (C) in a proportion of 0.1 to 10 mass % of the crosslinkable component (C), and a second step which kneads 100 parts by mass of the diene rubber (A), from 30 to 100 parts by mass of the filler (B), and from 0.3 to 30 parts by mass of the crosslinkable component (C).

The first step is performed by mixing the crosslinkable component (C) and the fibrillated fiber (D). The mixing method is not particularly limited, and for example, mixing can be performed by using a homogenizer, rotary mixer, electromagnetic mixer, propeller mixer. In the first step, from the perspective of ease in handling, a substance containing water may be used as the fibrillated fiber (D). When the fibrillated fiber (D) contains water, dehydration (drying) is preferably performed to remove the water contained in the fibrillated fiber (D). Dehydration allows the fibrillated fiber (D) to be suitably dispersed in the crosslinkable component (C), and also allows the crosslinkable component (C) containing the fibrillated fiber (D) to be suitably mixed with the diene rubber (A) and the filler (B). The dehydration method is not particularly limited, and the dehydration method may be, for example, vacuum degassing performed after the mixing of the crosslinkable component (C) and the fibrillated fiber (D), or may be oven drying, freeze drying, spray drying, or the like performed prior to the mixing of the fibrillated fiber (D) and the crosslinkable component (C).

The first step is performed prior to the second step from the perspective of well-dispersing the fibrillated fiber (D), contained in the crosslinkable component (C), in the diene rubber (A) which is the main component. That is, the method of producing the rubber composition for a tire includes dispersing the fibrillated fiber (D) in the crosslinkable component (C) in the first step and then kneading the crosslinkable component (C) containing the fibrillated fiber (D) with the diene rubber (A) and the filler (B) in the second step.

The method of performing the second step is not particularly limited, and examples thereof include a method whereby the above-mentioned components are kneaded using a publicly known method and device (e.g. Banbury mixer, kneader, roll, or the like), and the like.

In the second step, the crosslinkable component (C) containing the fibrillated fiber (D) may be kneaded with the diene rubber (A) and the filler (B) in a condition that does not allow the reactive functional group of the crosslinkable component (C) to react, or may be kneaded with the diene rubber (A) and the filler (B) after allowing at least a part of the reactive functional group of the crosslinkable component (C) containing the fibrillated fiber (D) to react. Note that "does not allow the reactive functional group to react" indicates the case where curing treatment is not substantially performed on the crosslinkable component (C) containing the fibrillated fiber (D), and for example, indicates the case where the crosslinkable component (C) containing the fibrillated fiber (D) after the first step is used as is, used without adding a catalyst, reaction initiator, curing component, crosslinking component, or the like that acts on the reactive functional group, or used without performing a treatment that intentionally applies a stimulus, such as heat, temperature, water, moisture, and ultraviolet light, that acts on the reactive functional group, for the second step. Furthermore, "allowing at least a part of the reactive functional group to react" indicates the case where a catalyst, reaction initiator, curing component, crosslinking component, or the like that acts on the reactive functional group of the crosslinkable component (C) is added, or the case where a treatment that intentionally applies a stimulus, such as heat, temperature, water, moisture, and ultraviolet light, that acts on the reactive functional group is performed. The expression "allowing at least a part of the reactive functional group to react" also includes the case where the crosslinking reaction does not completely proceed but partially proceeds to cure the crosslinkable component (C) (e.g. the case where gelling occurs) as well as the case where the crosslinking reaction proceeds to cure the crosslinkable component (C). In the condition where the crosslinkable component (C) containing the fibrillated fiber (D) is cured, the reactive functional group of the crosslinkable component (C) reacts to crosslink a part or all of the crosslinkable component (C). Note that the degree of the curing of the crosslinkable component (C) in which the fibrillated fiber (D) is dispersed can be determined, for example, by the rubber hardness of the tire produced using the rubber composition 1 for a tire. The rubber hardness is, for example, a hardness measured in accordance with JIS K 6253 using a durometer. Note that, when the obtained rubber composition 1 for a tire is vulcanized and formed into a tire, the rubber hardness of the crosslinkable component (C) is less than the hardness of the diene rubber (A).

Furthermore, the rubber composition 1 for a tire of the present technology can be vulcanized or crosslinked under conventionally known vulcanizing or crosslinking conditions.

Rubber Composition 2 for Tire

The rubber composition for a tire according to the second embodiment of the present technology (hereinafter, also referred to as "rubber composition 2 for a tire") will be described below.

The rubber composition 2 for a tire is a rubber composition in which, in the basic structure of the rubber composition for a tire described above, the crosslinkable component (C) is a polyether-based polymer or copolymer having, in a molecule, at least one reactive functional group bonded by a covalent bond selected from the group consisting of an urethane bond, urea bond, amide bond, imino bond, ketone bond, and ester bond, and the reactive functional group is at least one functional group selected from the group consisting of a hydroxy group, silane functional group, isocyanate group, (meth)acryloyl group, allyl group, carboxy group, acid anhydride group, and epoxy group.

Note that the descriptions regarding the diene rubber (A), the filler (B), the fibrillated fiber (D), the thermally expanding microcapsules, the silane coupling agent, the other components, and the contents of these components and the crosslinkable component (C) of the rubber composition 1 for a tire will be also applied to the rubber composition 2 for a tire unless otherwise described hereinafter.

In the rubber composition 2 for a tire, the crosslinkable component (C) is different from the crosslinkable component (C) used in the rubber composition 1 for a tire. Specifically, the crosslinkable component (C) of the rubber composition 2 for a tire is different from the crosslinkable component (C) of the rubber composition 1 for a tire in that the crosslinkable component (C) of the rubber composition 2 is a polyether-based polymer or copolymer and has a reactive functional group that is bonded through the covalent bond which is exemplified above. Note that the reactive functional group contained in the crosslinkable component (C) of the rubber composition 2 for a tire is the same as that of the rubber composition 1 for a tire.

Examples of the polyether-based polymer or copolymer include polyethylene glycol, polypropylene glycol (PPG), polypropylene triol, ethylene oxide/propylene oxide copolymers, polytetramethylene ether glycol (PTMEG), sorbitol-based polyol, and the like.

Among these, the main chain of the crosslinkable component (C) preferably contains an alkylene oxide monomer unit, more preferably the proportion of this monomer unit is greater than 50 mass %, and even more preferably the proportion of this monomer unit is 70 mass % or greater.

Furthermore, specific examples of the alkylene oxide monomer unit include repeating units represented by —$CH_2CH_2O$—, —$CH_2CH(CH_3)O$—, —$CH_2CH(C_2H_5)O$—, —$CH(CH_3)CH_2O$—, —$CH(C_2H_5)CH_2O$—, —$CH_2CH_2CH_2O$—, —$CH_2CH_2CH_2CH_2O$—, or the like. The alkylene oxide monomer unit may be composed of only one type of these repeating units, or may be composed of two or more types of these repeating units.

Among these, from the perspective of achieving excellent balance between friction performance on ice and wear resistance of a tire, the alkylene oxide monomer unit is preferably a propylene oxide (—$CH_2CH(CH_3)O$—) monomer unit.

In the rubber composition 2 for a tire, the main chain of the crosslinkable component (C) (e.g. alkylene oxide monomer unit described above) and the reactive functional group are bonded through a covalent bond selected from the group consisting of an urethane bond, urea bond, amide bond, imino bond, ketone bond, and ester bond.

Note that "bonded through a covalent bond" indicates the condition where, for example, an oxygen atom at a terminal of the alkylene oxide monomer unit (e.g. propylene oxide) constituting the main chain is bonded to a silicon atom of the hydrolyzable silyl group and/or a nitrogen atom of the isocyanate group through a covalent bond, including an urethane bond or the like.

Among these covalent bonds, an urethane bond is preferable from the perspective of achieving excellent friction performance on ice and wear resistance.

By using the rubber composition in which such a crosslinkable component (C) is compounded, a tire having excellent friction performance on ice and excellent wear resistance can be produced.

It is conceived that the reason why the friction performance on ice is excellent is due to the formation of a domain of the organic polymer (gel) in a matrix of the diene rubber (A) as a result of gelling caused by the reaction between molecules or the like of the crosslinkable component (C) due to hydrolysis or moisture in the presence of the reactive functional group.

Furthermore, it is conceived that the reason why the wear resistance is excellent is because rubber physical properties of the diene rubber (A) are not affected by the other components or the like of the composition of the present technology. It is conceived that increase in the viscosity of the rubber composition was suppressed by the interaction between the covalent bond and the silanol group present on the particle surface of the filler (especially, silica) (B).

The rubber composition 2 for a tire can be produced by the same method as that of rubber composition 1 for a tire except for using the crosslinkable component (C) described for the rubber composition 2 for a tire.

Rubber Composition for Tire 3

The rubber composition for a tire according to the third embodiment of the present technology (hereinafter, also referred to as "rubber composition 3 for a tire") will be described below.

The rubber composition 3 for a tire is a rubber composition which, in the basic structure of the rubber composition for a tire described above, further contains from 0.05 to 12 parts by mass of microparticles (E) that are three-dimensionally crosslinked and that have an average particle diameter of 0.1 to 100 μm, where the microparticles (E) are microparticles, in which an oligomer or polymer (e1) that is not miscible with the crosslinkable component (C) is three-dimensionally crosslinked.

Note that the description regarding the diene rubber (A), the filler (B), the fibrillated fiber (D), the thermally expanding microcapsules, the silane coupling agent, the other components, and the contents of these components and the crosslinkable component (C) of the rubber composition 1 for a tire will be also applied to the rubber composition 3 for a tire unless otherwise described hereinafter.

The crosslinkable component (C) contained in the rubber composition 3 for a tire is not particularly limited as long as the crosslinkable component (C) is an oligomer that is not miscible with the diene rubber and that is crosslinkable or a polymer that is not miscible with the diene rubber and that is crosslinkable.

Note that "not miscible (with the diene rubber)" does not indicate the condition of being not miscible with all the rubber components that could be used as the diene rubber (A) but indicates the condition where components of a specific combination of the diene rubber (A) and the crosslinkable component (C) contained in the rubber component for a tire are not miscible with each other.

Examples of the crosslinkable component (C) include a polyether-based, polyester-based, polyolefin-based, polycarbonate-based, aliphatic-based, saturated hydrocarbon-based, acrylic-based, or plant-derived polymer or copolymer described above. These polymers or copolymers are the same as those described for the rubber composition 1 for a tire.

Among these, from the perspective of suitably using an aliphatic-based polymer or copolymer (e.g. liquid diene polymer) as the oligomer or polymer (e1) described below, the crosslinkable component (C) is preferably a polyether-based, polyester-based, polyolefin-based, polycarbonate-based, acrylic-based, or plant-derived polymer or copolymer.

The crosslinkable component (C) is selected from the group consisting of a hydroxy group, silane functional group, isocyanate group, (meth)acryloyl group, allyl group, carboxy group, acid anhydride group, and epoxy group.

At least one reactive functional group is preferably contained. The crosslinkable component (C) having such a reactive functional group makes friction performance on ice of a tire even better by causing crosslinking between molecules. The reactive functional group is the same as the reactive functional group described for the rubber composition 1 for a tire. In the rubber composition 3 for a tire, from the perspective of achieving excellent dispersibility with the diene rubber (A) and/or kneading processability of the rubber composition, and from the perspective of facilitating the adjustment of particle diameter and/or shape when the microparticles (D) described below are prepared in the crosslinkable component (C), the weight average molecular weight or number average molecular weight of the crosslinkable component (C) is preferably from 300 to 30,000, and more preferably from 500 to 25,000.

Similar to the fibrillated fiber (D) of the rubber composition 1 for a tire, by compounding the fibrillated fiber (D) in a manner that the fibrillated fiber (D) is dispersed in advance in the crosslinkable component (C), the fibrillated fiber (D) is dispersed in the diene rubber (A) in an amount of 5 mass % or less of the compounded amount of the fibrillated fiber (D), and basically, the fibrillated fiber (D) is not dispersed in the diene rubber (A) (basically, the fibrillated fiber (D) is dispersed in the crosslinkable component (C)). Note that the case where the fibrillated fiber (D) is basically dispersed in the crosslinkable component (C) also includes the case where a part of the fibrillated fiber (D) exists in the crosslinkable component (C) while another part of the fibrillated fiber (D) exists in the diene rubber (A). Meanwhile, by compounding the fibrillated fiber (D) in a manner that the fibrillated fiber (D) is dispersed in advance in the crosslinkable component (C), a large amount of the fibrillated fiber (D) is present in the vicinity of the microparticle (E) in a manner that the fiber surrounds the microparticle (E). For example, when the proportion of the region occupied by the microparticle (E) relative to the region occupied by an imaginary circle, which is overlapped with the region occupied by the microparticle (E) and has a diameter equal to the maximum length of a sample cross section of an aggregate of the fibrillated fiber (D) surrounding the microparticle (E), is measured using an optical microscope at n (n≥20) positions of a cut sample of a tire, the average value of the proportion is roughly 90% or greater.

Microparticle (E)

The microparticles (E) will be described below.

The microparticles (E) contained in the rubber composition 3 for a tire of the present technology are microparticles that are three-dimensionally crosslinked and that have an average particle diameter of 0.1 to 100 μm.

From the perspectives of making the surface of the tire appropriately rough and achieving even better friction performance on ice, the average particle diameter of the microparticles (E) is preferably from 1 to 50 μm, and more preferably from 5 to 40 μm.

Note that the average particle diameter indicates the average value of the equivalent circle diameter measured using a laser microscope, and for example, can be measured by the laser diffraction scattering particle size distribution analyzer LA-300 (manufactured by Horiba, Ltd.), laser microscope VK-8710 (manufactured by Keyence Corporation), and the like.

In the present technology, the content of the microparticles (E) is from 0.05 to 12 parts by mass, preferably from 0.1 to 10 parts by mass, and more preferably from 0.5 to 6 parts by mass, per 100 parts by mass of the diene rubber (A).

By compounding the predetermined amount of the microparticles (E), the studless tire, in which the rubber composition 3 for a tire of the present technology is used in the tire tread, can exhibit excellent friction performance on ice and excellent wear resistance.

It is conceived that the friction performance on ice and the wear resistance are enhanced because the local strain is dispersed due to the elasticity of the microparticles (E) and thus stress is alleviated.

Furthermore, in the present technology, from the perspective of achieving even better friction performance on ice and wear resistance of a tire, the microparticles (E) are preferably microparticles in which the oligomer or polymer (e1) that is not miscible with the crosslinkable component (C) is three-dimensionally crosslinked in advance in the crosslinkable component (C). This is because the crosslinkable component (C) is expected to function as a solvent of the microparticles (E), and the effect of enhancing dispersibility of the crosslinkable component (C) and the microparticles (E) in the rubber composition is expected when these mixtures are compounded in the rubber composition. Note that the microparticles (E) may be substances in which the oligomer or polymer (e1) is not three-dimensionally crosslinked in advance in the crosslinkable component (C). For example, the microparticles (E) may be obtained by the method including producing microparticles by three-dimensionally crosslinking an oligomer or polymer (e1) in another solvent that is different from the crosslinkable component (C), and then removing the other solvent after adding and kneading the microparticles in the crosslinkable component (C), or during or after kneading the mixture with the diene rubber (A).

Note that "not miscible (with the crosslinkable component (C))" does not indicate the condition of being not miscible with all the components that could be used as the crosslinkable component (C) but indicates the condition where components of a specific combination of the crosslinkable component (C) and the oligomer or polymer (e1) contained in the rubber component for a tire are not miscible with each other.

Examples of the oligomer or polymer (e1) include a polycarbonate-based, aliphatic-based, saturated hydrocarbon-based, acrylic-based, plant-derived polymer or copolymer, and the like.

Examples of the aliphatic-based polymer or copolymer include liquid diene polymers, such as polyisoprene, polybutadiene, and styrene-butadiene copolymer; chloroprene rubber; butyl rubber; nitrile rubber; modified products containing a partially hydrogenated product of these and/or a reactive functional group described below; and the like.

Furthermore, examples of the saturated hydrocarbon-based polymer or copolymer include hydrogenated polyisoprene, hydrogenated polybutadiene, ethylene propylene, epichlorohydrin, chlorinated polyethylene, chlorosulfonated polyethylene, hydrogenated nitrile rubber, polyisobutylene, acrylic rubber, and the like.

Furthermore, examples of the polycarbonate-based polymer or copolymer include substances obtained by transesterification reaction of polyol compounds (e.g. 1,6-hexanediol, 1,4-butanediol, 1,5-pentanediol, and the like) and dialkyl carbonates, and the like.

Furthermore, examples of the acrylic-based polymer or copolymer include acrylic polyols; homopolymers of acrylates, such as acrylate, methyl acrylate, ethyl acrylate, butyl acrylate, and 2-ethylhexyl acrylate; acrylate copolymers formed by combining two or more types of these acrylates; and the like.

Furthermore, examples of the plant-derived polymer or copolymer include plant oils and fats, such as castor oil and soybean oil; various elastomers derived from polyester polyol or the like formed by modifying polylactic acid or the like; and the like.

Among these, an aliphatic-based polymer or copolymer is preferable, and from the perspective of achieving even better friction performance on ice and wear resistance of a tire, a liquid diene polymer is more preferable.

Examples of commercially available product of the liquid polyisoprene include Kuraprene LIR-30 and Kuraprene LIR-50 (both manufactured by Kuraray Co., Ltd.), Poly ip (manufactured by Idemitsu Kosan Co., Ltd.), and the like.

Furthermore, examples of the liquid polybutadiene include homopolymer type, such as Kuraprene LBR-305 (manufactured by Kuraray Co., Ltd.); copolymer type of 1,2-bond butadiene and 1,4-bond butadiene, such as Poly bD (manufactured by Idemitsu Kosan Co., Ltd.); copolymer type of ethylene, 1,4-bond butadiene, and 1,2-bond butadiene, such as Kuraprene L-SBR-820 (manufactured by Kuraray Co., Ltd.); and the like.

In the present technology, from the perspective of three-dimensionally crosslinking only the oligomer or polymer (e1) in the crosslinkable component (C), the oligomer or polymer (e1) preferably contains at least one reactive functional group selected from the group consisting of a hydroxy group, silane functional group, isocyanate group, (meth) acryloyl group, allyl group, carboxy group, acid anhydride group, and epoxy group that is different from the reactive functional group contained in the crosslinkable component (C) and that does not react with the reactive functional group contained in the crosslinkable component (C).

Note that the silane functional group is also referred to as a crosslinkable silyl group. Specific examples thereof include, similar to the silane functional group contained in the crosslinkable component (C) described above, a hydrolyzable silyl group; silanol group; functional groups in which a silanol group is substituted with an acetoxy group derivative, enoxy group derivative, oxime group derivative, amine group derivative, or the like; and the like.

Note that, after the oligomer or polymer (e1) is three-dimensionally crosslinked, the crosslinkable component (C) may contain the reactive functional group that is the same as the oligomer or polymer (e1) (e.g. carboxy group, hydrolyzable silyl group, and the like), and the already contained functional group may be modified to form the reactive functional group that is the same as the oligomer or polymer (e1).

Among these functional groups, from the perspective of easily proceeding the three-dimensional crosslinking of the oligomer or polymer (e1), a hydroxyl group, silane functional group, carboxy group, or acid anhydride group is preferably contained, and a carboxy group or acid anhydride group is more preferably contained.

Examples of commercially available product of the liquid polyisoprene having a carboxy group include Kuraprene LIR-410 (isoprene-monomethyl maleate-modified isoprene copolymer; number average molecular weight: 25,000, manufactured by Kuraray Co., Ltd.), and the like. Examples of commercially available product of the liquid polyisoprene having an acid anhydride group include Kuraprene LIR-403 (isoprene-maleic anhydride-modified isoprene copolymer; number average molecular weight: 34,000, manufactured by Kuraray Co., Ltd.), and the like.

In the present technology, the reactive functional group is preferably contained at least at a terminal of the main chain of the oligomer or polymer (e1), and when the main chain is a straight chain, 1.5 or more reactive functional groups are preferably contained, and 2 or more reactive functional groups are more preferably contained. On the other hand, when the main chain is branched, 3 or more reactive functional groups are preferably contained.

Furthermore, in the present technology, from the perspectives of making the particle diameter and the crosslinking density of the microparticles (E) to appropriate and achieving even better friction performance on ice of a tire, the weight average molecular weight or number average molecular weight of the oligomer or polymer (e1) is not particularly limited, and is preferably from 1,000 to 100,000, and more preferably from 3,000 to 60,000.

Note that the weight average molecular weight or number average molecular weight is measured by gel permeation chromatography (GPC) based on calibration with standard polystyrene.

Method of Preparing Microparticle (E)

Examples of the method of preparing the microparticles (E) by three-dimensionally crosslinking the oligomer or polymer (e1) in the crosslinkable component (C) include methods in which three-dimensional crosslinking is performed using the reactive functional group contained in the oligomer or polymer (e1). Specific examples thereof include methods in which the oligomer or polymer (e1) containing the reactive functional group is reacted with at least one type of component (e2) selected from the group consisting of water, a catalyst, and a compound having a functional group that reacts with the reactive functional group, to form three-dimensional crosslink, and the like.

Note that the water of the component (e2) can be suitably used when the oligomer or polymer (e1) contains a hydrolyzable silyl group, isocyanate group, or acid anhydride group as a reactive functional group.

Furthermore, examples of the catalyst of the component (e2) include a condensation catalyst of a silanol group (silanol condensation catalyst), and the like.

Specific examples of the silanol condensation catalyst include dibutyltin dilaurate, dibutyltin dioleate, dibutyltin diacetate, tetrabutyl titanate, tin(I) octanoate, and the like.

Furthermore, examples of the compound having a functional group that reacts with the reactive functional group of the compound (e2) include hydroxy group-containing compounds, silanol compounds, hydrosilane compounds, diisocyanate compounds, amine compounds, oxazolidine compounds, enamine compounds, ketimine compounds, and the like.

The hydroxy group-containing compound can be suitably used when the oligomer or polymer (e1) contains an isocyanate group or acid anhydride group as a reactive functional group.

The molecular weight, backbone, and the like of the hydroxy group-containing compound are not limited as long as the hydroxy group-containing compound is a compound having at least two hydroxy group in a molecule. Examples thereof include low molecular weight polyhydric alcohols, polyether polyols, polyester polyols, polycarbonate polyols, polycaprolactone polyols, other polyols, mixed polyols of these, and the like.

The silanol compound can be suitably used when the oligomer or polymer (e1) contains a silane functional group as a reactive functional group.

Specific examples of the silanol compound include tert-butyldimethylsilanol, diphenylmethylsilanol, silanol group-containing polydimethylsiloxanes, silanol group-containing cyclic polysiloxanes, and the like.

The hydrosilane compound is a compound having an SiH group and can be suitably used when the oligomer or polymer (e1) contains an allyl group as a reactive functional group.

Specific examples of the hydrosilane compound include 1,1,3,3-tetramethyldisiloxane, 1,3,5,7-tetramethyltetracyclosiloxane, 1,3,5,7,8-pentamethylpentacyclosiloxane, and the like.

The diisocyanate compound can be suitably used when the oligomer or polymer (e1) contains a hydroxy group as a reactive functional group.

Specific examples of the diisocyanate compound include aromatic polyisocyanates, such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates, such as hexamethylene diisocyanate (HDI), trimethylhexamethylene diisocyanate (TMHDI), lysine diisocyanate, and methyl norbornane diisocyanate (NBDI); and the like.

The amine compound can be suitably used when the oligomer or polymer (e1) contains an isocyanate group, carboxy group, acid anhydride group, epoxy group, or the like as a reactive functional group.

The molecular weight, skeleton, or the like of the amine compound is not limited as long as the amine compound is a compound having an amino group in a molecule. Examples thereof include primary amines, such as butylamine, hexylamine, octylamine, dodecylamine, oleylamine, cyclohexylamine, and benzylamine; secondary amines, such as dibutylamine; polyamines, such as diethylenetriamine, triethylenetetramine, guanidine, diphenylguanidine, and xylylenediamine; and the like.

The oxazolidine compound, the enamine compound, and the ketimine compound can be suitably used when the oligomer or polymer (e1) contains an isocyanate group, acid anhydride group, epoxy group, or the like as a reactive functional group.

Specifically, compounds that are conventionally known as latent curing agents can be used as these compounds. In particular, an oxazolidine compound and/or ketimine compound is preferably used.

The oxazolidine compound is not particularly limited as long as the oxazolidine compound is a compound having at least one oxazolidine ring, which is a saturated five-membered ring having an oxygen and a nitrogen, in a molecule. Specific examples thereof include N-hydroxyalkyloxazolidine, oxazolidine silyl ether, carbonate oxazolidine, ester oxazolidine, and the like.

As such an oxazolidine compound, commercially available products, such as Hardener OZ (ester oxazolidine, manufactured by Sumika Bayer Urethane Co., Ltd.), can also be used.

The ketimine compound is a compound that generates a primary amine as an active hydrogen group-containing compound by hydrolysis. Note that, in the present technology, a compound having a C=N bond (ketimine bond) derived from ketone or aldehyde and amine is referred to as ketimine, the ketimine also includes aldimine having an —HC=N bond.

Examples of the ketimine include substances having a structure in which a carbon atom of branched structure or a carbon atom as a ring member is bonded at the α-position of at least one of the carbon atom or the nitrogen atom of the ketimine bond. Examples of the carbon atom as a ring member include a carbon atom constituting an aromatic ring and a carbon atom constituting an alicycle.

Specific examples of the ketimine include (1) ketimine which is a reaction product of polyamine and a carbonyl compound and (2) silicon-containing ketimine which is a reaction product of aminoalkoxysilane and a carbonyl compound.

As such a ketimine compound, commercially available products, such as jER cure H3 (manufactured by Mitsubishi Chemical Corporation) and KBE-9103 (manufactured by Shin-Etsu Chemical Co., Ltd.), can be also used.

In the present technology, a solvent can be used as necessary when the microparticles (E) are prepared by three-dimensionally crosslinking the oligomer or polymer (e1) in the crosslinkable component (C).

Examples of the mode of use of the solvent include a mode where a plasticizer, diluent, and solvent that serve as a good solvent for the oligomer or polymer (e1) and serve as a poor solvent for the crosslinkable component (C) are used, and/or a mode where a plasticizer, diluent, and solvent that serve as a good solvent for the crosslinkable component (C) and serve as a poor solvent for the oligomer or polymer (e1) are used.

Specific examples of such a solvent include aliphatic hydrocarbons, such as n-pentane, isopentane, neopentane, n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and isooctane; alicyclic hydrocarbons, such as cyclopentane, cyclohexane, and methyl cyclopentane; aromatic hydrocarbons, such as xylene, benzene, and toluene; terpene-based organic solvents, such as α-pinene, β-pinene, and limonene; and the like.

Furthermore, in the present technology, when the microparticles (E) are prepared by three-dimensionally crosslinking the oligomer or polymer (e1) in the crosslinkable component (C), the microparticles (E) are preferably prepared by using additives, such as a surfactant, emulsifier, dispersing agent, and silane coupling agent. As the silane coupling agent, a silane coupling agent that is the same as the silane coupling agents described for the rubber composition 1 for a tire can be used. The compounded amount of the silane coupling agent is preferably from 0.1 to 10 mass % relative to the amount of the fibrillated fiber (D) from the perspectives of achieving excellent dispersibility of the fibrillated fiber (D) in the crosslinkable component (C) and enhancing the affinity of the fibrillated fiber (D) to the surface of the microparticle (E).

Furthermore, in the rubber composition for a tire of the present technology, a surfactant can be compounded besides the "other components" described above. The compounded amount of the surfactant is preferably from 1 to 30 parts by mass, and more preferably from 3 to 20 parts by mass, per 100 parts by mass of the fibrillated fiber (D) from the perspective of achieving excellent dispersibility of the fibrillated fiber (D) in the crosslinkable component (C). The surfactant is, for example, added to the crosslinkable component (C) before or at the same time as the dispersion of the fibrillated fiber (D) in the crosslinkable component (C). It is conceived that, when the content of the surfactant is within the range described above, the fibrillated fiber (D) tends to be selectively arranged on the surface of the microparticle (E) in the crosslinkable component (C), thereby making the dispersibility of the fibrillated fiber (D) excellent.

Method of Producing Rubber Composition 3 for Tire

The method of producing the rubber composition 3 for a tire of the present technology comprises a first step which disperses the fibrillated fiber (D) in the crosslinkable component (C) in a proportion of 0.1 to 10 mass % of the crosslinkable component (C), and a second step which kneads 100 parts by mass of the diene rubber (A), from 30 to 100 parts by mass of the filler (B), from 0.3 to 30 parts by mass of the crosslinkable component (C), and from 0.05 to 12 parts by mass of the microparticles (D).

The first step is the same as the first step described for the rubber composition 1 for a tire.

The method of performing the second step is the same as that of the first step described for the method of producing the rubber compositions 1 and 2 for tires. In the second step, the crosslinkable component (C) containing the microparticles (E) is preferably kneaded with the diene rubber (A) and the filler (B) after the microparticles (E) are dispersed in the crosslinkable component (C) in advance. In this case, the first step may be performed after the microparticles (E) are dispersed in the crosslinkable component (C) advance, or may be performed before the microparticles (E) are dispersed in the crosslinkable component (C); however, the first step is preferably performed after the microparticles (E) are dispersed in the crosslinkable component (C) in advance. By this, it is conceived that the fibrillated fiber (D) can be arranged in the crosslinkable component (C) in a manner that the fibrillated fiber (D) covers the surface of the microparticle (E) thereby being stably compounded in the crosslinkable component (C).

Furthermore, in the second step, the crosslinkable component (C) containing the fibrillated fiber (D) and the microparticles (E) may be kneaded with the diene rubber (A) and the filler (B) in a condition that does not allow the reactive functional group of the crosslinkable component (C) containing the fibrillated fiber (D) and the microparticles (E) to react; or the crosslinkable component (C) containing the fibrillated fiber (D) and the microparticles (E) may be kneaded with the diene rubber (A) and the filler (B) after allowing at least a part of the reactive functional group of the crosslinkable component (C) containing the fibrillated fiber (D) to react. Note that "does not allow the reactive functional group to react" indicates the case where the crosslinkable component (C) containing the fibrillated fiber (D) is not cured, and for example, indicates the case where the crosslinkable component (C) containing the fibrillated fiber (D) after the first step is used as is or used without adding the component (e2), for the second step. Furthermore, "allowing at least a part of the reactive functional group to react" indicates the case where the reactive functional group of the fibrillated fiber (D) is cured. The expression "(being) cured" also includes the case where the crosslinking reaction does not completely proceed but partially proceeds to cure the crosslinkable component (C) (e.g. the case where gelling occurs) as well as the case where the crosslinking reaction of the crosslinkable component (C) completely proceeds to cure.

In the condition where the crosslinkable component (C) containing the fibrillated fiber (D) is cured, the reactive functional group of the crosslinkable component (C) reacts to crosslink a part or all of the crosslinkable component (C). Note that the degree of the curing of the crosslinkable component (C) in which the fibrillated fiber (D) is dispersed can be determined, for example, by the rubber hardness of the tire produced using the rubber composition for a tire. The rubber hardness is, for example, a hardness measured in accordance with JIS K 6253 using a durometer. Note that, when the obtained rubber composition 1 for a tire is vulcanized and formed into a tire, the rubber hardness of the crosslinkable component (C) is less than the hardness of the diene rubber (A).

Furthermore, the rubber composition for a tire of the present technology can be vulcanized or crosslinked under conventionally known vulcanizing or crosslinking conditions.

Studless Tire

The studless tire of the present technology (hereinafter, also simply referred to as "tire of the present technology") is a studless tire comprising a tire tread portion (hereinafter, referred to as "tread portion") formed from the rubber composition for a tire of the present technology described above.

The FIGURE is a schematic, partial cross-sectional view of a tire that represents an embodiment of the studless tire of the present technology, but the tire of the present technology is not limited to the embodiment illustrated in the FIGURE.

In the FIGURE, reference numeral 1 represents a bead portion, reference numeral 2 represents a side wall portion, and reference numeral 3 represents a tread portion formed from the rubber composition for a tire of the present technology.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

The tire of the present technology can be produced by, for example, forming a tire tread portion by performing vulcanization or crosslinking at a temperature corresponding to the type and compounding ratio of the diene rubber, vulcanizing agent, and crosslinking agent used in the rubber compositions 1 to 3 for tires of the present technology.

EXAMPLES

The present technology will be described below by means of examples.

Working Examples for Rubber Compositions 1 and 2 for Tires

To produce the rubber compositions for tires of Working Examples 1 to 6 and Comparative Examples 1 to 6, the following components among the components shown in Tables 1 to 3 were prepared as described below.

Preparation of Fibrillated Fiber-Dispersed Crosslinkable Polymer 1 (Working Example 1)

In a three-necked flask, 500 g of bifunctional polypropylene glycol (Preminol S 4012, manufactured by Asahi Glass Co., Ltd.; number average molecular weight: 10,000; hydroxyl value: 11.2) and 50 g of cellulose nanofiber (BiNFi-s cellulose 2, manufactured by Sugino Machine Ltd.; content of effective fiber: 2 wt %; average fiber length: 2 μm; average fiber diameter: 0.02 μm) as the fibrillated fiber were mixed and vacuum-degassed at 110° C. for 5 hours to remove the moisture contained in the fibrillated fiber. After the mixture was cooled to 80° C., 20.5 g of 3-isocyanate propyltrimethoxysilane (Y-5187, manufactured by Momentive Performance Materials Japan LLC) was added and agitated at 80° C. for 8 hours to prepare a fibrillated fiber-dispersed crosslinkable polymer. Note that this crosslinkable polymer body contains 0.2 mass % of the fibrillated fiber based on the theoretical calculation.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Dispersed Crosslinkable Polymer 2 (Working Example 2)

In a three-necked flask, 500 g of bifunctional polypropylene glycol (Preminol S 4012, manufactured by Asahi Glass Co., Ltd.; number average molecular weight: 10,000; hydroxyl value: 11.2) and 120 g of microfibrous aramid fiber (Tiara KY400S, manufactured by Daicel FineChem Ltd.; content of effective fiber: 20 wt %; fiber diameter: 0.3 μm to 1 μm) as the fibrillated fiber were mixed and vacuum-degassed at 110° C. for 5 hours to remove the moisture contained in the fibrillated fiber. After the mixture was cooled to 80° C., 20.5 g of 3-isocyanate propyltrimethoxysilane (Y-5187, manufactured by Momentive Performance Materials Japan LLC) was added and agitated at 80° C. for 8 hours to prepare a fibrillated fiber-dispersed crosslinkable polymer. Note that this crosslinkable polymer contains 4.4 mass % (4.6 mass % relative to the amount of the crosslinkable component (C)) of the fibrillated fiber based on the theoretical calculation.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Free Crosslinkable Polymer 1 (Comparative Example 1)

A crosslinkable polymer was prepared in the same manner as for the crosslinkable polymer used in Working Example 1 except that no fibrillated fiber was contained.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Dispersed Crosslinkable Polymer 3 (Comparative Example 2)

In a three-necked flask, 500 g of bifunctional polypropylene glycol (Preminol S 4012, manufactured by Asahi Glass Co., Ltd.; number average molecular weight: 10,000; hydroxyl value: 11.2) and 300 g of microfibrous aramid fiber (Tiara KY400S, manufactured by Daicel FineChem Ltd.; content of effective fiber: 20 wt %; fiber diameter: 0.3 μm to 1 μm) as the fibrillated fiber were mixed and vacuum-degassed at 110° C. for 5 hours to remove the moisture contained in the fibrillated fiber. After the mixture was cooled to 80° C., 20.5 g of 3-isocyanate propyltrimethoxysilane (Y-5187, manufactured by Momentive Performance Materials Japan LLC) was added and agitated at 80° C. for 8 hours to prepare a fibrillated fiber-dispersed crosslinkable polymer. Note that this crosslinkable polymer body contains 10.3 mass % (11.5 mass % relative to the amount of the crosslinkable component (C)) of the fibrillated fiber based on the theoretical calculation.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Dispersed Crosslinked Body 1 (Working Example 3)

In a three-necked flask, 850 g of hydroxy group-containing acrylic polyol (Arufon UH-2000, manufactured by Toagosei Co., Ltd.; weight average molecular weight: 11,000; hydroxyl value: 20) and 200 g of cellulose nanofiber (BiNFi-s cellulose 2, manufactured by Sugino Machine Ltd.; average fiber length: 2 μm; average fiber diameter: 0.02 μm) as the fibrillated fiber were loaded, mixed, and vacuum-degassed at 110° C. for 5 hours to remove the moisture contained in the fibrillated fiber. Thereafter, 78.7 g of 3-isocyanate propyltriethoxysilane (A-1310, manufactured by Momentive Performance Materials Japan LLC) was added and agitated at 80° C. for 8 hours to add a hydrolyzable silyl group to an acrylic polymer terminal. Furthermore, 40 g of lactic acid was added to this, mixed, and immediately taken out in a container, and the mixture was left in the container at 90° C. for 5 hours to be cured.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Dispersed Crosslinked Body 2 (Working Example 4)

In a three-necked flask, 850 g of hydroxy group-containing acrylic polyol (Arufon UH-2000, manufactured by Toagosei Co., Ltd.; weight average molecular weight: 11,000; hydroxyl value: 20) and 80 g of microfibrous cellulose (Celish KY100G, manufactured by Daicel FineChem Ltd.; average fiber length: 420 μm; average fiber diameter: 0.3 μm) as the fibrillated fiber were mixed and vacuum-degassed at 110° C. for 5 hours to remove the moisture contained in the fibrillated fiber. After the mixture was cooled to 80° C., 78.7 g of 3-isocyanate propyltriethoxysilane (A-1310, manufactured by Momentive Performance Materials Japan LLC) was added and agitated at 80° C. for 8 hours to add a hydrolyzable silyl group to an acrylic polymer terminal. Furthermore, 40 g of lactic acid was added to this, mixed, and immediately taken out in a container, and the mixture was left in the container at 90° C. for 5 hours to be cured.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Free Crosslinked Body 1 (Comparative Example 3)

In a three-necked flask, 850 g of hydroxy group-containing acrylic polyol (Arufon UH-2000, manufactured by Toagosei Co., Ltd.; weight average molecular weight: 11,000; hydroxyl value: 20) was vacuum-degassed at 110° C. for 5 hours to remove the moisture. After the mixture was cooled to 80° C., 78.7 g of 3-isocyanate propyltriethoxysilane (A-1310, manufactured by Momentive Performance Materials Japan LLC) was added and agitated at 80° C. for 8 hours to add a hydrolyzable silyl group to an acrylic polymer terminal. Furthermore, 40 g of lactic acid was added to this, mixed, and immediately taken out in a container, and the mixture was left in the container at 90° C. for 5 hours to be cured.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Dispersed
Crosslinkable Polymer 4 (Working Example 5)

In a three-necked flask, 510 g of trifunctional polypropylene glycol (Excenol 5030, manufactured by Asahi Glass Co., Ltd.; number average molecular weight: 5,100) and 80 g of microfibrous cellulose (Celish KY100G, manufactured by Daicel FineChem Ltd.; average fiber length: 420 µm; average fiber diameter: 0.3 µm) as the fibrillated fiber were mixed and vacuum-degassed at 110° C. for 5 hours to remove the moisture contained in the fibrillated fiber. After the mixture was cooled to 80° C., 74.2 g of 3-isocyanate propyltriethoxysilane (A-1310, manufactured by Momentive Performance Materials Japan LLC) was added and agitated continuously for 8 hours to prepare a fibrillated fiber-dispersed crosslinkable polymer.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Dispersed
Crosslinked Body 3 (Working Example 6)

In a three-necked flask, 510 g of trifunctional polypropylene glycol (Excenol 5030, manufactured by Asahi Glass Co., Ltd.; number average molecular weight: 5,100) was loaded, and then 10 g of cellulose nanofiber (Celish KY100S, manufactured by Daicel FineChem Ltd.; fiber length: 300 µm to 1,000 µm; average fiber diameter: 0.14 µm) as the fibrillated fiber was added, mixed, and vacuum-degassed at 110° C. for 5 hours to remove the moisture contained in the fibrillated fiber. Thereafter, 55 g of m-xylylene diisocyanate (Takenate 500, manufactured by Mitsui Chemicals, Inc.) was added and reacted at 80° C. for 3 hours. After the mixture was cooled to 50° C., 25 g of 1,4-butanediol was added, mixed, and immediately taken out in a container, and the mixture was maintained as is in the container at 50° C. for 12 hours to be cured.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Preparation of Fibrillated Fiber-Free Crosslinkable
Polymer 2 (Comparative Example 4)

A crosslinkable polymer was prepared in the same manner as for the crosslinkable polymer used in Working Example 5 except that no microfibrous cellulose was added. To the prepared crosslinkable polymer, the diene rubber (A), the filler (B), and the other compounding agents shown in the table were mixed, and then microfibrous cellulose (Celish KY100G, manufactured by Daicel FineChem Ltd.; average fiber length: 420 µm; average fiber diameter: 0.3 µm) was mixed into the mixture in the proportion shown in the table. That is, a rubber composition was produced by dispersing the microfibrous cellulose in advance in the crosslinkable polymer, and the rubber composition was then heated and vulcanized as a tread portion to produce a tire.

Preparation of Fibrillated Fiber-Free Crosslinked
Body 2 (Comparative Example 5)

A crosslinked body was prepared in the same manner as for the crosslinked body used in Working Example 6 except that no fibrillated fiber was added. To the prepared crosslinked body, the diene rubber (A), the filler (B), and the other compounding agents shown in the table were mixed, and then cellulose nanofiber (Celish KY100S, manufactured by Daicel FineChem Ltd.; fiber length: 300 µm to 1,000 µm; average fiber diameter: 0.14 µm) was mixed into the mixture in the proportion shown in the table. That is, a rubber composition was produced by dispersing the cellulose nanofiber in advance in the crosslinkable polymer, and the rubber composition was then heated and vulcanized as a tread portion to produce a tire.

Preparation of Fibrillated Fiber-Dispersed
Crosslinked Body 4 (Comparative Example 6)

400 g of maleic acid-modified liquid polyisoprene rubber (Kuraprene LIR-403, manufactured by Kuraray Co., Ltd.; number average molecular weight: 34,000), 200 g of process oil (Diana Process Oil PS-32, manufactured by Idemitsu Kosan Co., Ltd.), and 80 g of microfibrous cellulose (Celish KY100G, manufactured by Daicel FineChem Ltd.; average fiber length: 420 µm; average fiber diameter: 0.3 µm) as the fibrillated fiber were mixed and vacuum-degassed at 110° C. for 5 hours to remove the moisture contained in the fibrillated fiber. After the mixture was cooled to 60° C., 35 g of oxazolidine compound (Hardener OZ, manufactured by Sumika Bayer Urethane Co., Ltd.) was mixed and crosslinked to prepare a fibrillated fiber-dispersed crosslinked body 4.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

The average fiber length and the average fiber diameter of the fibrillated fibers used in the crosslinked bodies and the crosslinkable polymers described above were determined by calculating an average for each of the fiber length and the fiber diameter using n (n≥20) fibers that intersect with a straight line marked on a scanning electron micrograph of the fibrillated fibers.

The components shown in Tables 1 to 3 were compounded in the proportions (part by mass) shown in Tables 1 to 3. Specifically, a master batch was obtained by first kneading the components shown in Tables 1 to 3 below, except for the sulfur and the vulcanization accelerator, for 5 minutes in a 1.7 liter sealed mixer, and then discharging the kneaded product when the temperature reached 150° C. Note that, in Tables 1 to 3, number(s) written in parentheses represents a mass ratio of the crosslinkable component to the fibrillated fiber contained in a crosslinkable polymer or crosslinked body.

A rubber composition was obtained by kneading the sulfur and the vulcanization accelerator with the obtained master batch using an open roll.

A vulcanized rubber sheet was then produced by vulcanizing the obtained rubber composition for 15 minutes at 170° C. in a mold for Lambourn abrasion (disk having a diameter of 63.5 mm and a thickness of 5 mm).

Index of Coefficient of Friction on Ice (Index of Friction Performance on Ice)

The produced vulcanized rubber sheet was adhered to a flat cylindrical rubber base and a coefficient of friction on ice was measured using an inside drum frictional force on ice tester. The measurement temperature was −1.5° C., the load was 5.5 g/cm$^3$, and the drum rotation speed was 25 km/hr.

The index of coefficient of friction on ice is expressed as an index with the measured value for Comparative Example 1 expressed as an index of 100, and shown in Table 1 below. A larger index indicates greater frictional force on ice and better friction performance on ice.

Index=(measured value/coefficient of friction on ice of test piece of Comparative Example 1)×100

Wear Resistance

Wear resistance test was performed in accordance with JIS K 6264-2:2005 using a Lambourn abrasion test machine (manufactured by Iwamoto Seisakusho Co. Ltd.) under the following conditions to measure wear mass: applied force: 4.0 kg/cm$^3$ (=39 N); slip rate: 30%; duration of wear resistance test: 4 minutes; and test temperature: room temperature.

The test result was expressed as an index with the measured value for Comparative Example 1 expressed as an index of 100 based on the formula below, and was shown in the row of "Wear resistance" in Tables 1 to 3. A larger index indicates less amount of wear and better wear resistance.

Index=(amount of wear of test piece of Comparative Example 1/measured value)×100

For the index of coefficient of friction on ice and the index of wear resistance determined as described above, the balance between the friction performance on ice and the wear resistance was evaluated as excellent when each of the indices was larger than 100 and the total of the indices was 220 or larger.

TABLE 1

|  | Working Example 1 | Working Example 2 | Comparative Example 1 | Comparative Example 2 |
|---|---|---|---|---|
| NR | 50 | 50 | 50 | 50 |
| BR | 50 | 50 | 50 | 50 |
| Carbon black | 35 | 35 | 35 | 35 |
| Silica | 25 | 25 | 25 | 25 |
| Silane coupling agent | 2 | 2 | 2 | 2 |
| Fibrillated fiber-dispersed crosslinkable polymer 1 (crosslinkable component/fibrillated fiber) | 10 (9.98/ 0.02) |  |  |  |
| Fibrillated fiber-dispersed crosslinkable polymer 2 (crosslinkable component/fibrillated fiber) |  | 10 (9.56/ 0.44) |  |  |
| Fibrillated fiber-free crosslinkable polymer 1 (crosslinkable component/fibrillated fiber) |  |  | 10 (10/0) |  |
| Fibrillated fiber-dispersed crosslinkable polymer 3 (crosslinkable component/fibrillated fiber) |  |  |  | 10 (8.97/ 1.03) |
| Zinc oxide | 4 | 4 | 4 | 4 |
| Stearic acid | 2 | 2 | 2 | 2 |
| Anti-aging agent | 2 | 2 | 2 | 2 |
| Wax | 2 | 2 | 2 | 2 |
| Oil | 20 | 20 | 20 | 20 |
| Sulfur | 1.5 | 1.5 | 1.5 | 1.5 |
| Vulcanization accelerator | 1.5 | 1.5 | 1.5 | 1.5 |
| Friction performance on ice | 110 | 115 | 100 | 115 |
| Wear resistance | 110 | 105 | 100 | 95 |

TABLE 2

|  | Working Example 3 | Working Example 4 | Comparative Example 3 |
|---|---|---|---|
| NR | 50 | 50 | 50 |
| BR | 50 | 50 | 50 |
| Carbon black | 35 | 35 | 35 |
| Silica | 25 | 25 | 25 |
| Silane coupling agent | 2 | 2 | 2 |
| Fibrillated fiber-dispersed crosslinked body 1 (crosslinkable component/fibrillated fiber) | 10 (9.96/0.04) |  |  |
| Fibrillated fiber-dispersed crosslinked body 2 (crosslinkable component/fibrillated fiber) |  | 10 (9.92/0.08) |  |
| Fibrillated fiber-nondispersed crosslinked body 1 (crosslinkable component/fibrillated fiber) |  |  | 10 (10/0) |
| Thermally expanding microcapsule | 5 | 5 | 5 |
| Zinc oxide | 4 | 4 | 4 |
| Stearic acid | 2 | 2 | 2 |
| Anti-aging agent | 2 | 2 | 2 |
| Wax | 2 | 2 | 2 |
| Oil | 20 | 20 | 20 |
| Sulfur | 1.5 | 1.5 | 1.5 |
| Vulcanization accelerator | 1.5 | 1.5 | 1.5 |
| Friction performance on ice | 120 | 120 | 110 |
| Wear resistance | 110 | 105 | 105 |

TABLE 3

|  | Working Example 5 | Working Example 6 | Comparative Example 4 | Comparative Example 5 | Comparative Example 6 |
|---|---|---|---|---|---|
| NR | 50 | 50 | 50 | 50 | 50 |
| BR | 50 | 50 | 50 | 50 | 50 |
| Carbon black | 35 | 35 | 35 | 35 | 35 |
| Silica | 25 | 25 | 25 | 25 | 25 |
| Silane coupling agent | 2 | 2 | 2 | 2 | 2 |
| Fibrillated fiber-dispersed crosslinkable polymer 4 (crosslinkable component/fibrillated fiber) | 10 (9.86/ 0.14) |  |  |  |  |
| Fibrillated fiber-dispersed crosslinked body 3 (crosslinkable component/fibrillated fiber) |  | 10 (9.96/ 0.04) |  |  |  |

TABLE 3-continued

| | Working Example 5 | Working Example 6 | Comparative Example 4 | Comparative Example 5 | Comparative Example 6 |
|---|---|---|---|---|---|
| Fibrillated fiber-free crosslinkable polymer 2 (crosslinkable component/fibrillated fiber) | | | 10 (10/0) | | |
| Fibrillated fiber-free crosslinked body 2 (crosslinkable component/fibrillated fiber) | | | | 10 (10/0) | |
| Fibrillated fiber-dispersed crosslinked body 4 (crosslinkable component/fibrillated fiber) | | | | | 10 (9.87/ 0.13) |
| Fibrillated fiber 1 | | | 1.4(0.14) | | |
| Fibrillated fiber 2 | | | | 0.17(0.04) | |
| Zinc oxide | 4 | 4 | 4 | 4 | 4 |
| Stearic acid | 2 | 2 | 2 | 2 | 2 |
| Anti-aging agent | 2 | 2 | 2 | 2 | 2 |
| Wax | 2 | 2 | 2 | 2 | 2 |
| Oil | 20 | 20 | 20 | 20 | 20 |
| Sulfur | 1.5 | 1.5 | 1.5 | 1.5 | 1.5 |
| Vulcanization accelerator | 1.5 | 1.5 | 1.5 | 1.5 | 1.5 |
| Friction performance on ice | 115 | 115 | 110 | 110 | 100 |
| Wear resistance | 105 | 105 | 100 | 100 | 95 |

The following components were used as the components shown in Tables 1 to 3.

NR: Natural rubber (STR 20, manufactured by Von Bundit Co., Ltd.; glass transition temperature: −65° C.)

BR: Polybutadiene rubber (Nipol BR1220, manufactured by Zeon Corporation; glass transition temperature: −110° C.)

Carbon black: Show Black N339 (manufactured by Cabot Japan K.K.)

Silica: ULTRASIL VN3 (manufactured by Evonik Degussa)

Silane coupling agent: Silane coupling agent (Si69, manufactured by Evonik Degussa)

Fibrillated fiber-dispersed crosslinked bodies 1 to 4: Crosslinked bodies produced as described above Fibrillated fiber-dispersed crosslinkable polymers 1 to 5: Crosslinkable polymers produced as described above Fibrillated fiber-free crosslinked bodies 1 and 2: Crosslinked bodies produced as described above Fibrillated fiber-free crosslinkable polymers 1 and 2: Crosslinkable polymers produced as described above Thermally expanding microcapsules: Matsumoto Microsphere F-100 (manufactured by Matsumoto Yushi-Seiyaku Co., Ltd.)

Fibrillated fiber 1: Celish KY100G (manufactured by Daicel FineChem Ltd.)

Fibrillated fiber 2: Celish KY100S (manufactured by Daicel FineChem Ltd.)

Zinc oxide: Zinc Oxide #3 (manufactured by Seido Chemical Industry Co., Ltd.)

Stearic acid: Beads stearic acid YR (manufactured by Nippon Oil & Fats Co., Ltd.)

Anti-aging agent: Amine-based anti-aging agent (Santflex 6PPD, manufactured by Flexsys)

Wax: Paraffin wax (manufactured by Ouchi Shinko Chemical Industrial Co., Ltd.)

Oil: Aroma oil (Extract 4S, manufactured by Showa Shell Sekiyu K.K.)

Sulfur: 5% Oil-treated sulfur (manufactured by Hosoi Chemical Industry Co., Ltd.)

Vulcanization accelerator: Sulfenamide-based vulcanization accelerator (Sanceller CM-G, manufactured by Sanshin Chemical Industry Co., Ltd.)

As is clear from the results shown in Table 1, Comparative Example 2, which was prepared by compounding the fibrillated fiber (D) in an amount exceeding 10 mass % relative to the amount of the crosslinkable component (C), enhanced the friction performance on ice but led to inferior wear resistance compared to Comparative Example 1, which did not contain the fibrillated fiber (D).

On the other hand, it was found that Working Examples 1 and 2, which were prepared by compounding the fibrillated fiber (D) in an amount of 0.1 to 10 mass % relative to the amount of the crosslinkable component (C), enhanced both the friction performance on ice and the wear resistance and had excellent balance between the friction performance on ice and the wear resistance compared to Comparative Example 1, which did not contain the fibrillated fiber (D).

As is clear from the results shown in Table 2, Working Examples 3 and 4, which were prepared by using the fibrillated fiber (D) having an average fiber length of 1 to 1,000 μm and an average fiber diameter of 0.01 to 1 μm, enhanced both the friction performance on ice and the wear resistance and had excellent balance between the friction performance on ice and the wear resistance.

As is clear from the results shown in Table 3, Working Examples 5 and 6, which were prepared by dispersing the fibrillated fiber (D) in advance in the crosslinkable component (C), enhanced both the friction performance on ice and the wear resistance and had excellent balance between the friction performance on ice and the wear resistance compared to Comparative Examples 4 and 5 which were prepared without dispersing the fibrillated fiber (D) in advance in the crosslinkable component (C).

Furthermore, Working Examples 5 and 6, which were prepared by using the crosslinkable component (C) that is not miscible with the diene rubber (A), enhanced both the friction performance on ice and the wear resistance and had excellent balance between the friction performance on ice and the wear resistance compared to Comparative Example 6 which was prepared by using the crosslinkable component that is miscible with the diene rubber (A).

Note that, in Working Examples 1 to 6, which were prepared by dispersing the fibrillated fiber (D) in advance in the crosslinkable component (C), it was confirmed that the fibrillated fiber (D) was not dispersed in the diene rubber (A) by component analysis.

Working Examples for Rubber Composition 3 for Tire

To produce the rubber compositions for tires of Working Examples 11 to 22 and Comparative Examples 13, 15, and 16, the following components among the components shown in Tables 4 to 7 were prepared as described below.

Fibrillated Fiber-Dispersed and Microparticle-Containing Crosslinked Body 1 (Working Example 11)

In a three-necked flask, 150 g of styrene acrylic emulsion (CG-8370, emulsion manufactured by DIC Corporation;

solid content: 50%; particle diameter: 0.12 µm), 405 g of bifunctional polypropylene glycol (Preminol S 4012, manufactured by Asahi Glass Co., Ltd.; number average molecular weight: 10,000; hydroxyl value: 11.2) and 125 g of cellulose nanofiber (BiNFi-s cellulose 2, manufactured by Sugino Machine Ltd.; content of effective fiber: 2 wt %; average fiber length: 2 µm; average fiber diameter: 0.02 µm) were loaded, mixed, and vacuum-degassed at 110° C. for 5 hours to remove the moisture contained in the fibrillated fiber. After the mixture was cooled to 80° C., 17 g of 3-isocyanate propyltrimethoxysilane (Y-5187, manufactured by Momentive Performance Materials Japan LLC) was added and agitated at 80° C. for 3 hours to prepare a fibrillated fiber-dispersed crosslinkable polymer. Thereafter, 5 g of dioctyltin laurate (DOTL) as an organotin compound was added and mixed for 10 minutes, and then heating was stopped and the mixture was left as is to obtain a cured fibrillated fiber-dispersed and microparticle-containing crosslinked body. Note that the content ratio of crosslinkable component/fibrillated fiber/styrene acrylic microparticles of the fibrillated fiber-dispersed and microparticle-containing crosslinked body (crosslinked body 1) was 84.5/0.5/15.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed And Microparticle-Containing Crosslinkable Polymer 1 (Working Example 12)

In a three-necked flask, 50 g of maleic acid-modified liquid polyisoprene rubber (Kuraprene LIR-403, manufactured by Kuraray Co., Ltd.; number average molecular weight: 34,000), 20 g of process oil (Diana process oil PS-32, manufactured by Idemitsu Kosan Co., Ltd.), 4.5 g of oxazolidine compound (Hardener OZ, manufactured by Sumika Bayer Urethane Co., Ltd.), 400 g of bifunctional polypropylene glycol (Preminol S 4012, manufactured by Asahi Glass Co., Ltd.; number average molecular weight: 10,000; hydroxyl value: 11.2), and 0.5 g of water were mixed. The temperature thereof was raised to 80° C. and the mixture was agitated for 40 minutes. Thereafter, 1 g of nonionic surfactant (Newpol PE-64, manufactured by Sanyo Chemical Industries, Ltd.) was added to the mixture and further agitated for 30 minutes. Thereafter, 125 g of cellulose nanofiber (BiNFi-s cellulose 2, manufactured by Sugino Machine Ltd.; content of effective fiber: 2 wt %; average fiber length: 2 µm; average fiber diameter: 0.02 µm) was added, mixed, and vacuum-degassed at 110° C. for 5 hours to remove the moisture contained in the fibrillated fiber. After the mixture was cooled to 50° C., 5 g of vinylsilane (KBM 1003, manufactured by Shin-Etsu Chemical Co., Ltd.) was added and agitated for 3 hours, and then 17 g of 3-isocyanate propyltrimethoxysilane (Y-5187, manufactured by Momentive Performance Materials Japan LLC) was added and agitated at 50° C. for 6 hours to prepare a fibrillated fiber-dispersed crosslinkable polymer. The content ratio of crosslinkable component/fibrillated fiber/polyisoprene microparticles of the fibrillated fiber-dispersed and microparticle-containing crosslinkable polymer (polymer 1) was 84.5/0.5/15.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and Microparticle-Free Crosslinkable Polymer 2 (Working Example 22)

A fibrillated fiber-dispersed and microparticle-free crosslinkable polymer 2 was obtained by substantially the same manner as in Working Example 12 except that the maleic acid-modified liquid polyisoprene rubber, process oil, oxazolidine compound, and water were not used. That is, in a three-necked flask, 470 g of bifunctional polypropylene glycol (Preminol S 4012, manufactured by Asahi Glass Co., Ltd.; number average molecular weight: 10,000; hydroxyl value: 11.2) and 125 g of cellulose nanofiber (BiNFi-s cellulose 2, manufactured by Sugino Machine Ltd.; content of effective fiber: 2 wt %; average fiber length: 2 µm; average fiber diameter: 0.02 µm) were loaded, mixed, and vacuum-degassed at 110° C. for 5 hours to remove the moisture contained in the fibrillated fiber. After the mixture was cooled to 50° C., 6 g of vinylsilane (KBM 1003, manufactured by Shin-Etsu Chemical Co., Ltd.) was added and agitated for 3 hours, and then 20 g of 3-isocyanate propyltrimethoxysilane (Y-5187, manufactured by Momentive Performance Materials Japan LLC) was added and agitated at 50° C. for 6 hours to prepare a fibrillated fiber-dispersed crosslinkable polymer (polymer 2). The content ratio of crosslinkable component/fibrillated fiber/microparticles of the crosslinkable polymer was 99.5/0.5/0.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Example Containing No Fibrillated Fiber and No Microparticle-Containing Crosslinkable Polymer (Comparative Example 13)

The diene rubber (A) and the filler (B) shown in the table and other compounding agents shown in the table were mixed, in the proportions shown in the table without blending any of fibrillated fiber or microparticle-containing crosslinkable polymer, to form a rubber composition. The rubber composition was then heated and vulcanized as a tread portion to produce a tire.

Fibrillated Fiber-Dispersed and Microparticle-Containing Crosslinkable Polymer 4 (Working Example 13)

In a three-necked flask, 40 g of maleic acid-modified liquid polyisoprene rubber (Kuraprene LIR-403, manufactured by Kuraray Co., Ltd.; number average molecular weight: 34,000), 16.5 g of process oil (Diana process oil PS-32, manufactured by Idemitsu Kosan Co., Ltd.), 3.5 g of oxazolidine compound (Hardener OZ, manufactured by Sumika Bayer Urethane Co., Ltd.), 1,200 g of hydrolyzable silyl group-containing polyoxypropylene glycol (S2410, manufactured by Asahi Glass Co., Ltd.), and 1 g of water were mixed. The temperature thereof was raised to 80° C. and the mixture was agitated for 40 minutes. Thereafter, 1 g of nonionic surfactant (Newpol PE-64, manufactured by Sanyo Chemical Industries, Ltd.) was added to the mixture and further agitated for 30 minutes. Thereafter, 100 g of cellulose nanofiber (BiNFi-s cellulose 2, manufactured by Sugino Machine Ltd.; content of effective fiber: 2 wt %;

average fiber length: 2 µm; average fiber diameter: 0.02 µm) was added, mixed, and vacuum-degassed at 110° C. for 10 hours to remove the moisture contained in the fibrillated fiber. The content ratio of crosslinkable component/fibrillated fiber/polyisoprene microparticles of the fibrillated fiber-dispersed and microparticle-containing crosslinkable polymer (polymer 4) was 10/0.017/0.5. When the polymer 4 was mixed in a proportion of 10.517 parts by mass relative to 50 parts by mass of NR and 50 parts by mass of BR, the content of the microparticles was 0.5 parts by mass.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and Microparticle-Containing Crosslinkable Polymer 5 (Working Example 14)

In a three-necked flask, 270 g of acrylic emulsion (Acronal YJ-2741D, manufactured by Mitsubishi Chemical BASF Co., Ltd.; solid content: 56%) and 300 g of hydrolyzable silyl group-containing polyoxypropylene glycol (S2410, manufactured by Asahi Glass Co., Ltd.) were loaded and mixed for 30 minutes. Thereafter, 75 g of cellulose nanofiber (BiNFi-s cellulose 2, manufactured by Sugino Machine Ltd.; content of effective fiber: 2 wt %; average fiber length: 2 µm; average fiber diameter: 0.02 µm) was added, mixed, and vacuum-degassed at 110° C. for 12 hours to remove the moisture contained in the fibrillated fiber. The content ratio of crosslinkable component/fibrillated fiber/acrylic microparticles of the fibrillated fiber-dispersed and microparticle-containing crosslinkable polymer (polymer 5) was 20/0.1/10. When the polymer 5 was mixed in a proportion of 30.1 parts by mass relative to 50 parts by mass of NR and 50 parts by mass of BR, the content of the microparticles was 10 parts by mass.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and Microparticle-Containing Crosslinkable Polymer 7 (Working Example 15)

To 1,000 g of polyoxypropylene glycol having a terminal capped with hydrolyzable silyl (S-2420, manufactured by Asahi Glass Co., Ltd.), 100 g of liquid polybutadiene having a terminal capped with a hydroxy group (Poly bd R45HT, manufactured by Idemitsu Kosan Co., Ltd.; number average molecular weight: 2,800; hydroxy value: 46.6), 60 g of polybutene (H-100, manufactured by BP-Amoco plc.), 6.0 g of m-xylylene diisocyanate (Takenate 500, manufactured by Mitsui Chemicals, Inc.), and 1.0 g of 75% ethyl acetate solution of trimethylol propane adduct of xylylene diisocyanate (Takenate D110N, manufactured by Mitsui Takeda Chemicals Inc.; NCO content: 11.5%) were added and agitated again at 80° C. for 5 hours to prepare a white turbid paste-like product.

When this paste-like product was observed using the laser microscope VK-8710 (manufactured by Keyence Corporation), it was confirmed that microparticles having a particle diameter of 5 to 10 µm (backbone: polybutadiene; crosslink: urethane bonding) were produced and dispersed in polyether having a terminal capped with a hydrolyzable silyl group. Furthermore, as a result of subjecting this image to image processing and 3D profiling, the content (mass %) of the microparticles in the paste-like product was approximately 10%. Thereafter, 55 g of cellulose nanofiber (BiNFi-s cellulose 2, manufactured by Sugino Machine Ltd.; content of effective fiber: 2 wt %; average fiber length: 2 µm; average fiber diameter: 0.02 µm) as the fibrillated fiber was added, mixed, and vacuum-degassed at 110° C. for 5 hours to remove the moisture contained in the fibrillated fiber. The content ratio of crosslinkable component/fibrillated fiber/polyisoprene microparticles of the fibrillated fiber-dispersed and microparticle-containing crosslinkable polymer was 100/0.11/16.7, taking the value for the crosslinkable component to be 100. The content of the microfibrillated fiber was approximately 0.1 wt % of the crosslinkable polymer (polymer 7). When the polymer 7 was mixed in a proportion of 10 parts by mass relative to 50 parts by mass of NR and 50 parts by mass of BR, the content ratio of crosslinkable component/fibrillated fiber/polyisoprene microparticles was 8.56/0.0086/1.43.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and Microparticle-Containing Crosslinked Body 2 (Working Example 16)

To 400 g of polyoxypropylene glycol having a terminal capped with a hydrolyzable silyl group (S-2410, manufactured by Asahi Glass Co., Ltd.), 25 g of maleic acid-modified liquid polyisoprene rubber (Kuraprene LIR-403, manufactured by Kuraray Co., Ltd.; number average molecular weight: 34,000), 15 g of process oil (Diana process oil PS-32, manufactured by Idemitsu Kosan Co., Ltd.), 1 g of oxazolidine compound (Hardener OZ, manufactured by Sumika Bayer Urethane Co., Ltd.), and 0.3 g of distilled water were added, and agitated in a three-necked flask at 50° C. for 60 minutes. Thereafter, 0.1 g of vinyltrimethoxysilane (A-171, manufactured by Momentive Performance Materials Japan LLC) and 0.4 g of polyoxyethylene sorbitan tristearate (Rheodol TW-0320V, manufactured by Kao Corporation) were added and agitated for 30 minutes to prepare a white turbid paste-like product.

When this paste-like product was observed using the laser microscope VK-8710 (manufactured by Keyence Corporation), it was confirmed that microparticles having a particle diameter of 10 to 30 µm (backbone: polyisoprene; crosslink: amide ester bonding) were produced and dispersed in polyoxypropylene glycol having a terminal capped with a hydrolyzable silyl group. Furthermore, as a result of subjecting this image to image processing and 3D profiling, the content (mass %) of the microparticles in the paste-like product was approximately 7%. Thereafter, 150 g of cellulose nanofiber (Celish KY100S, manufactured by Daicel FineChem Ltd.; solid content: 25%) as the fibrillated fiber was mixed and vacuum-degassed at 110° C. for 5 hours to remove the moisture contained in the fibrillated fiber.

The content ratio of crosslinkable component/fibrillated fiber/polyisoprene microparticles of the fibrillated fiber-dispersed and microparticle-containing crosslinkable polymer was 100/9.35/10.35, taking the value for the crosslinkable component to be 100. The content of the fibrillated fiber was 9.35 wt % of the crosslinked body (crosslinked body 2).

When this was mixed in a proportion of 10 parts by mass relative to 50 parts by mass of NR and 50 parts by mass of BR, the content ratio of crosslinkable component/fibrillated fiber/polyisoprene microparticles was 8.35/0.78/0.86.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and
Microparticle-Containing Crosslinkable Polymer 8
(Working Example 17)

To 950 g of polyoxypropylene glycol having a terminal capped with a hydrolyzable silyl group (MS Polymer 5810, manufactured by Kaneka Corporation), 47 g of maleic acid-modified liquid polyisoprene rubber (Kuraprene LIR-403, manufactured by Kuraray Co., Ltd.; number average molecular weight: 34,000), 34 g of process oil (Diana process oil P S-32, manufactured by Idemitsu Kosan Co., Ltd.), 2 g of oxazolidine compound (Hardener OZ, manufactured by Sumika Bayer Urethane Co., Ltd.), and 0.5 g of distilled water were added, and agitated in a three-necked flask at 50° C. for 60 minutes. Thereafter, 0.2 g of vinyltrimethoxysilane (A-171, manufactured by Momentive Performance Materials Japan LLC) and 1 g of polyoxyethylene sorbitan tristearate (Rheodol TW-0320V, manufactured by Kao Corporation) were added and agitated for 30 minutes to prepare a white turbid paste-like product.

When this paste-like product was observed using the laser microscope VK-8710 (manufactured by Keyence Corporation), it was confirmed that microparticles having a particle diameter of 10 to 30 μm (backbone: polyisoprene; crosslink: amide ester bonding) were produced and dispersed in polyoxypropylene glycol having a terminal capped with a hydrolyzable silyl group. Furthermore, as a result of subjecting this image to image processing and 3D profiling, the content (mass %) of the microparticles in the paste-like product was approximately 7.6%. Thereafter, 40 g of cellulose nanofiber (Celish KY100S, manufactured by Daicel FineChem Ltd.; solid content: 25%) as the fibrillated fiber was mixed and vacuum-degassed at 110° C. for 5 hours to remove the moisture contained in the fibrillated fiber. After the mixture was cooled to 50° C., 50 g of lactic acid was added and immediately agitated, and then taken out in a container. The mixture was maintained in the container at 80° C. for 5 hours to be cured.

The content ratio of crosslinked component/fibrillated fiber/acrylic microparticles of the fibrillated fiber-dispersed and microparticle-containing crosslinkable polymer (crosslinkable polymer 8) was 100/1.0/8.3, taking the value for the crosslinkable polymer to be 100. The content of the fibrillated fiber was 1 wt % of the crosslinkable polymer. When this was mixed in a proportion of 10 parts by mass relative to 50 parts by mass of NR and 50 parts by mass of BR, the amount in terms of part by mass of each component was 9.15/0.09/0.76.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and
Microparticle-Containing Crosslinkable Polymer 9
(Comparative Example 15)

To 800 g of polyoxypropylene glycol having a terminal capped with a hydrolyzable silyl group (S-2410, manufactured by Asahi Glass Co., Ltd.), 35 g of maleic acid-modified liquid polyisoprene rubber (Kuraprene LIR-403, manufactured by Kuraray Co., Ltd.; number average molecular weight: 34,000), 20 g of process oil (Diana process oil PS-32, manufactured by Idemitsu Kosan Co., Ltd.), 1.5 g of oxazolidine compound (Hardener OZ, manufactured by Sumika Bayer Urethane Co., Ltd.), and 0.3 g of distilled water were added, and agitated in a three-necked flask at 50° C. for 60 minutes. Thereafter, 0.2 g of vinyltrimethoxysilane (A-171, manufactured by Momentive Performance Materials Japan LLC) and 0.8 g of polyoxyethylene sorbitan tristearate (Rheodol TW-0320V, manufactured by Kao Corporation) were added and agitated for 30 minutes to prepare a white turbid paste-like product.

When this paste-like product was observed using the laser microscope VK-8710 (manufactured by Keyence Corporation), it was confirmed that microparticles having a particle diameter of 10 to 30 μm (backbone: polyisoprene; crosslink: amide ester bonding) were produced and dispersed in polyoxypropylene glycol having a terminal capped with a hydrolyzable silyl group. Furthermore, as a result of subjecting this image to image processing and 3D profiling, the content (mass %) of the microparticles in the paste-like product was approximately 6.6%.

Thereafter, 340 g of cellulose nanofiber (Celish KY100S, manufactured by Daicel FineChem Ltd.; solid content: 25%) as the fibrillated fiber was mixed and vacuum-degassed at 110° C. for 20 hours to remove the moisture contained in the fibrillated fiber.

The content ratio of crosslinkable component/fibrillated fiber/polyisoprene microparticles of the fibrillated fiber-dispersed and microparticle-containing crosslinkable polymer (crosslinkable polymer 9) was 100/10.59/7.06, taking the value for the crosslinkable polymer component to be 100. The content of the fibrillated fiber was approximately 10.6 wt %, which exceeds 10 wt % of the crosslinkable component. When this was mixed in a proportion of 10 parts by mass relative to 50 parts by mass of NR and 50 parts by mass of BR, the content ratio of crosslinkable component/fibrillated fiber/polyisoprene microparticles was 8.5/0.9/0.6.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Nondispersed and
Microparticle-Containing Crosslinkable Polymer 10
(Comparative Example 16)

A crosslinked body containing crosslinked microparticles were prepared by exactly the same method as that of Working Example 17 except that, of Working Example 17, the cellulose nanofiber (Celish KY100S, manufactured by Daicel FineChem Ltd.; solid content: 25%) as the fibrillated fiber was not added to the paste-like product and microparticle-containing crosslinkable polymer (polymer 10), and that 0.09 parts by mass of the polymer 10, relative to 50 parts by mass of the NR and 50 parts by mass of the BR, was mixed using a Banbury mixer and then the cellulose nanofiber was added. Production was performed by charging the Banbury mixer with 9.91 parts by mass of the produced crosslinked microparticle-containing crosslinked body and mixing them.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and
Microparticle-Containing Crosslinkable Polymer 11
(working Example 18)

In a three-necked flask, 160 g of acrylic emulsion (Acronal YJ-2720D, manufactured by Mitsubishi Chemical BASF Co., Ltd.; solid content: 56%; average particle diameter: 0.1 µm) and 200 g of cellulose nanofiber (BiNFi-s cellulose 2, manufactured by Sugino Machine Ltd.; content of effective fiber: 2 wt %; average fiber length: 2 µm; average fiber diameter: 0.02 µm) were loaded, mixed, and vacuum-degassed at 110° C. for 5 hours to remove roughly ⅓ of the moisture contained in these. After the mixture was cooled to 70° C., 425 g of hydrolyzable silyl group-containing polyoxypropylene glycol (MSP S-810, manufactured by Kaneka Corporation) were added and mixed for 30 minutes. Thereafter, the mixture was heated again to 110° C. and continued the vacuum-degassing for 12 hours to remove the rest of the moisture. The content ratio of crosslinkable component/fibrillated fiber/acrylic microparticles (average particle diameter: 0.1 µm) of the fibrillated fiber-dispersed and microparticle-containing crosslinkable polymer (polymer 11) was 100/0.94/18. When this was mixed in a proportion of 15 parts by mass relative to 50 parts by mass of NR and 50 parts by mass of BR, the content ratio of crosslinkable component/fibrillated fiber/acrylic microparticles was 12.61/0.12/2.27.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and
Microparticle-Containing Crosslinked Body 3
(Working Example 19)

In a three-necked flask, 120 g of liquid polyisoprene having a terminal capped with a hydroxy group (Poly ip, manufactured by Idemitsu Kosan Co., Ltd.; number average molecular weight: 2,500; hydroxyl value: 46.6) and 24.7 g of 3-isocyanate propyltriethoxysilane (A-1310, manufactured by Momentive Performance Materials Japan LLC) were loaded and agitated at 80° C. for 8 hours to obtain polyisoprene having a terminal capped with a hydrolyzable silyl group. To this, 850 g of polyoxypropylene glycol having a terminal capped with a hydroxy group (Preminol S-4012, manufactured by Asahi Glass Co., Ltd.; number average molecular weight: 10,000; hydroxyl value: 11.2), 0.2 g of distilled water, and 1 g of octyltin compound (Neostann S-1, manufactured by Nitto Kasei Co., Ltd.) were added and agitated at 80° C. for 3 hours. At this stage, when this paste-like product was observed using the laser microscope VK-8710 (manufactured by Keyence Corporation), it was confirmed that microparticles having a particle diameter of 5 to 20 µm (backbone: polyisoprene; crosslink: siloxane bonding) were produced and dispersed in polyoxypropylene glycol. Furthermore, as a result of subjecting this image to image processing and 3D profiling, the content (mass %) of the microparticles in the paste-like product was approximately 12%.

Thereafter, 200 g of cellulose nanofiber (BiNFi-s cellulose 2, manufactured by Sugino Machine Ltd.; content of effective fiber: 2 wt %; average fiber length: 2 µm; average fiber diameter: 0.02 µm) as the fibrillated fiber was mixed and vacuum-degassed at 110° C. for 5 hours to remove the moisture contained in the fibrillated fiber. Thereafter, the mixture was cooled to 80° C., 17.0 g of m-xylylene diisocyanate (Takenate 500, manufactured by Mitsui Chemicals, Inc.) was added and immediately agitated. The mixture was then taken out from the flask, transferred to a container, and maintained at 80° C. for 5 hours to be cured as is. The content ratio of crosslinked component/fibrillated fiber/polyisoprene microparticles (particle diameter: 5 to 20 µm) of the fibrillated fiber-dispersed and microparticle-containing crosslinked body (crosslinked body 3) was 100/0.46/16.69, taking the value for the crosslinked body to be 100. When this was mixed in a proportion of 15 parts by mass relative to 50 parts by mass of NR and 50 parts by mass of BR, the contents of crosslinked body component/fibrillated fiber/polyisoprene microparticles were 12.8/0.059/2.14.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and
Microparticle-Containing Crosslinked Body 4
(Working Example 20)

To 850 g of hydroxy group-containing acrylic polyol (Arufon UH-2000, manufactured by Toagosei Co., Ltd.; weight average molecular weight: 11,000; hydroxyl value: 20), 88 g of maleic acid-modified liquid polyisoprene rubber (Kuraprene LIR-403, manufactured by Kuraray Co., Ltd.; number average molecular weight: 34,000), 64 g of process oil (Diana process oil PS-32, manufactured by Idemitsu Kosan Co., Ltd.), 10 g of oxazolidine compound (Hardener OZ, manufactured by Sumika Bayer Urethane Co., Ltd.), and 2 g of distilled water were added. The temperature thereof was raised to 60° C. and the mixture was agitated for 30 minutes. Thereafter, 1 g of polyoxy ethylene sorbitan tristearate (Rheodol TW-0320V, manufactured by Kao Corporation) was added and agitated for 30 minutes. The temperature was then raised to 80° C., and the mixture was further agitated while being subjected to vacuum-degassing to prepare a white turbid microparticle-containing paste-like product. When this paste-like product was observed using the laser microscope VK-8710 (manufactured by Keyence Corporation), it was confirmed that microparticles having a particle diameter of 10 to 20 µm (backbone: polyisoprene; crosslink: amide ester bonding) were produced and dispersed in acrylic polyether. Furthermore, as a result of subjecting this image to image processing and 3D profiling, the content (mass %) of the microparticles in the paste-like product was approximately 16%.

Thereafter, 200 g of cellulose nanofiber (BiNFi-s cellulose 2, manufactured by Sugino Machine Ltd.; average fiber length: 2 µm; average fiber diameter: 0.02 µm) as the fibrillated fiber was mixed and vacuum-degassed at 110° C. for 5 hours to remove the moisture contained in the fibrillated fiber.

Thereafter, the mixture was cooled to 80° C., 30.0 g of m-xylylene diisocyanate (Takenate 500, manufactured by Mitsui Chemicals, Inc.) was added and immediately agitated. The mixture was then taken out from the flask, transferred to a container, and maintained at 80° C. for 5 hours to be cured as is.

The content ratio of crosslinked component/fibrillated fiber/polyisoprene microparticles of the fibrillated fiber-dispersed and microparticle-containing crosslinked body (crosslinked body 4) was 100/0.45/18.41, taking the value for the crosslinked body to be 100. When this was mixed in a proportion of 15 parts by mass relative to 50 parts by mass of NR and 50 parts by mass of BR, the content ratio of crosslinked body component/fibrillated fiber/polyisoprene microparticles was 12.62/0.057/2.32.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

Fibrillated Fiber-Dispersed and Microparticle-Containing Crosslinkable Polymer 13 (Working Example 21)

In a three-necked flask, 850 g of polycarbonate diol (Duranol T5652, manufactured by Asahi Kasei Chemicals Corporation; number average molecular weight: 2,000; hydroxyl value: 56), 150 g of acid anhydride-modified polybutadiene (Polyvest OC800S, manufactured by Evonik Degussa GmbH; number average molecular weight: 1,800 to 2,400), and 10 g of ketimine compound (HOK-01, manufactured by Toyo Gosei Co., Ltd.) were agitated at 60° C. for 3 hours. When this paste-like product was observed using the laser microscope VK-8710 (manufactured by Keyence Corporation), it was confirmed that microparticles having a particle diameter of 10 to 30 μm (backbone: polybutadiene; crosslink: amide bonding) were produced and dispersed in polycarbonate diol having a terminal capped with a hydrolyzable silyl group. Furthermore, as a result of subjecting this image to image processing and 3D profiling, the content of the microparticles in the paste-like product was approximately 10%.

To this, 200 g of cellulose nanofiber (BiNFi-s cellulose 2, manufactured by Sugino Machine Ltd.; average fiber length: 2 μm; average fiber diameter: 0.02 μm) as the fibrillated fiber was mixed and vacuum-degassed at 110° C. for 5 hours to remove the moisture contained in the fibrillated fiber. Thereafter, 200 g of 3-isocyanate propyltriethoxysilane (A-1310, manufactured by Momentive Performance Materials Japan LLC) was added. The temperature was raised to 80° C., and the mixture was agitated for 5 hours to prepare a pale yellow turbid paste-like product.

The content ratio of crosslinked component/fibrillated fiber/polybutadiene microparticles of the fibrillated fiber-dispersed and microparticle-containing crosslinkable polymer (polymer 13) was 100/0.381/15.24, taking the value for the crosslinkable polymer to be 100. When this was mixed in a proportion of 15 parts by mass relative to 50 parts by mass of NR and 50 parts by mass of BR, the content ratio of crosslinked body component/fibrillated fiber/polybutadiene microparticles was 12.97/0.049/1.98.

To this, the diene rubber (A) and the filler (B) shown in the table and other compounding agents shown in the table were mixed in the proportions shown in the table to form a rubber composition. The rubber composition was then heated and vulcanized as a tread portion to produce a tire.

The average fiber length and the average fiber diameter of the fibrillated fibers used in the crosslinked bodies and the crosslinkable polymers described above were determined by calculating an average for each of the fiber length and the fiber diameter using n (n≥20) fibers that intersect with a straight line marked on a scanning electron micrograph of the fibrillated fibers.

The components shown in Tables 4 to 7 below were compounded in the proportions (part by mass) shown in Tables 4 to 7 below. Specifically, a master batch was obtained by first kneading the components shown in Tables 4 to 7 below, except for the sulfur and the vulcanization accelerator, for 5 minutes in a 1.7 liter sealed mixer, and then discharging the kneaded product when the temperature reached 150° C. Note that, in Tables 4 to 7, number(s) written in parentheses represents a mass ratio of the crosslinkable component to fibrillated fiber to microparticles contained in a crosslinkable polymer or crosslinked body, except for Comparative Example 16 in Table 6. In Comparative Example 16 in Table 6, along with the mass ratio of the crosslinkable component and microparticle, the mass ratio of the fibrillated fiber relative to these components is written outside the parentheses.

Next, a rubber composition was obtained by kneading the sulfur and the vulcanization accelerator with the obtained master batch using an open roll.

A vulcanized rubber sheet was then produced by vulcanizing the obtained rubber composition for 15 minutes at 170° C. in a mold for Lambourn abrasion (disk having a diameter of 63.5 mm and a thickness of 5 mm).

Index of Coefficient of Friction on Ice (Index of Friction Performance on Ice)

The produced vulcanized rubber sheet was adhered to a flat cylindrical rubber base and a coefficient of friction on ice was measured using an inside drum frictional force on ice tester. The measurement temperature was −1.5° C., the load was 5.5 g/cm$^3$, and the drum rotation speed was 25 km/hr.

The index of coefficient of friction on ice is expressed as an index with the measured value for Comparative Example 13 expressed as an index of 100, and shown in Table 4 to Table 7 below. A larger index indicates greater frictional force on ice and better friction performance on ice.

Index=(measured value/coefficient of friction on ice of test piece of Comparative Example 13)×100

Wear Resistance

Wear resistance test was performed in accordance with JIS K 6264-2:2005 using a Lambourn abrasion test machine (manufactured by Iwamoto Seisakusho Co. Ltd.) under the following conditions to measure wear mass: applied force: 4.0 kg/cm$^3$ (=39 N); slip rate: 30%; duration of wear resistance test: 4 minutes; and test temperature: room temperature.

The test result was expressed as an index with the measured value for Comparative Example 13 expressed as an index of 100 based on the formula below, and was shown in the row of "Wear resistance" in Tables 4 to 7. A larger index indicates less amount of wear and better wear resistance.

Index=(amount of wear of test piece of Comparative Example 13 measured value)×100

For the index of friction performance on ice and the index of wear resistance determined as described above, the balance between the friction performance on ice and the wear resistance was evaluated as excellent when each of the indices was larger than 100 and the total of the indices was larger than 200. Furthermore, the balance between the friction performance on ice and the wear resistance was evaluated as particularly excellent when each of the indices was larger than 100 and the total of the indices was 210 or larger.

TABLE 4

|  | Working Example 11 | Working Example 12 | Working Example 22 | Comparative Example 13 |
|---|---|---|---|---|
| NR | 50 | 50 | 50 | 50 |
| BR | 50 | 50 | 50 | 50 |
| Carbon black | 35 | 35 | 35 | 35 |
| Silica | 25 | 25 | 25 | 25 |
| Silane coupling agent | 2 | 2 | 2 | 2 |
| Fibrillated fiber-dispersed and microparticle-containing crosslinked body 1 (crosslinkable component/fibrillated fiber/microparticle) | 10 (84.5/0.5/15) | | | |
| Fibrillated fiber-dispersed and microparticle-containing crosslinkable polymer 1 (crosslinkable component/fibrillated fiber/microparticle) | | 10 (84.5/0.5/15) | | |
| Fibrillated fiber-dispersed and microparticle-free crosslinkable polymer 2 (crosslinkable component/fibrillated fiber/microparticle) | | | 10 (99.5/0.5/0) | |
| Zinc oxide | 4 | 4 | 4 | 4 |
| Stearic acid | 2 | 2 | 2 | 2 |
| Anti-aging agent | 2 | 2 | 2 | 2 |
| Wax | 2 | 2 | 2 | 2 |
| Oil | 20 | 20 | 20 | 20 |
| Sulfur | 1.5 | 1.5 | 1.5 | 1.5 |
| Vulcanization accelerator | 1.5 | 1.5 | 1.5 | 1.5 |
| Friction performance on ice | 110 | 115 | 104 | 100 |
| Wear resistance | 106 | 104 | 103 | 100 |

TABLE 5

|  | Working Example 13 | Working Example 14 |
|---|---|---|
| NR | 50 | 50 |
| BR | 50 | 50 |
| Carbon black | 35 | 35 |
| Silica | 25 | 25 |
| Silane coupling agent | 2 | 2 |
| Fibrillated fiber-dispersed and microparticle-containing crosslinkable polymer 4 (crosslinkable component/fibrillated fiber/microparticle) | 10.517 (10/0.017/0.5) | |
| Fibrillated fiber-dispersed and microparticle-containing crosslinkable polymer 5 (crosslinkable component/fibrillated fiber/microparticle) | | 30.1 (20/0.1/10) |
| Zinc oxide | 4 | 4 |
| Stearic acid | 2 | 2 |
| Anti-aging agent | 2 | 2 |
| Wax | 2 | 2 |
| Oil | 20 | 20 |
| Sulfur | 1.5 | 1.5 |
| Vulcanization accelerator | 1.5 | 1.5 |
| Friction performance on ice | 110 | 110 |
| Wear resistance | 105 | 100 |

TABLE 6

|  | Working Example 15 | Working Example 16 | Working Example 17 | Comparative Example 15 | Comparative Example 16 |
|---|---|---|---|---|---|
| NR | 50 | 50 | 50 | 50 | 50 |
| BR | 50 | 50 | 50 | 50 | 50 |
| Carbon black | 35 | 35 | 35 | 35 | 35 |
| Silica | 25 | 25 | 25 | 25 | 25 |
| Silane coupling agent | 2 | 2 | 2 | 2 | 2 |
| Fibrillated fiber-dispersed and microparticle-containing crosslinkable polymer 7 (crosslinkable component/fibrillated fiber/microparticle) | 10 (8.56/0.0086/1.43) | | | | |
| Fibrillated fiber-dispersed and microparticle-containing crosslinked body 2 (crosslinkable component/fibrillated fiber/microparticle) | — | 10 (8.35/0.78/0.86) | | | |
| Fibrillated fiber-dispersed and microparticle-containing crosslinkable polymer 8 (crosslinkable component/fibrillated fiber/microparticle) | | | 10 (9.15/0.09/0.76) | | |
| Fibrillated fiber-dispersed and microparticle-containing crosslinkable polymer 9 (crosslinkable component/fibrillated fiber/microparticle) | | | | 10 (8.5/0.9/0.6) | |
| Fibrillated fiber-nondispersed and microparticle-containing crosslinkable polymer 10 (crosslinkable component/microparticle)/fibrillated fiber | | | | | 9.91 (9.15/0.76)/0.09 |
| Zinc oxide | 4 | 4 | 4 | 4 | 4 |
| Stearic acid | 2 | 2 | 2 | 2 | 2 |
| Anti-aging agent | 2 | 2 | 2 | 2 | 2 |
| Wax | 2 | 2 | 2 | 2 | 2 |
| Oil | 20 | 20 | 20 | 20 | 20 |
| Sulfur | 1.5 | 1.5 | 1.5 | 1.5 | 1.5 |
| Vulcanization accelerator | 1.5 | 1.5 | 1.5 | 1.5 | 1.5 |
| Friction performance on ice | 110 | 110 | 120 | 95 | 100 |
| Wear resistance | 105 | 100 | 105 | 95 | 95 |

TABLE 7

|  | Working Example 18 | Working Example 19 | Working Example 20 | Working Example 21 |
|---|---|---|---|---|
| NR | 50 | 50 | 50 | 50 |
| BR | 50 | 50 | 50 | 50 |
| Carbon black | 35 | 35 | 35 | 35 |
| Silica | 25 | 25 | 25 | 25 |
| Silane coupling agent | 2 | 2 | 2 | 2 |
| Fibrillated fiber-dispersed and microparticle-containing crosslinkable polymer 11 (crosslinkable component/fibrillated fiber/microparticle) | 15 (12.61/0.12/2.27) | | | |
| Fibrillated fiber-dispersed | | 15 | | |

TABLE 7-continued

|  | Working Example 18 | Working Example 19 | Working Example 20 | Working Example 21 |
|---|---|---|---|---|
| Fibrillated fiber-dispersed and microparticle-containing crosslinked body 3 (crosslinkable component/fibrillated fiber/microparticle) |  | 15 (12.8/ 0.059/ 2.14) |  |  |
| Fibrillated fiber-dispersed and microparticle-containing crosslinked body 4 (crosslinkable component/fibrillated fiber/microparticle) |  |  | 15 (12.62/ 0.057/ 2.32) |  |
| Fibrillated fiber-dispersed and microparticle-containing crosslinkable polymer 13 (crosslinkable component/fibrillated fiber/microparticle) |  |  |  | 15 (12.97/ 0.049/ 1.98) |
| Zinc oxide | 4 | 4 | 4 | 4 |
| Stearic acid | 2 | 2 | 2 | 2 |
| Anti-aging agent | 2 | 2 | 2 | 2 |
| Wax | 2 | 2 | 2 | 2 |
| Oil | 20 | 20 | 20 | 20 |
| Sulfur | 1.5 | 1.5 | 1.5 | 1.5 |
| Vulcanization accelerator | 1.5 | 1.5 | 1.5 | 1.5 |
| Friction performance on ice | 115 | 120 | 110 | 105 |
| Wear resistance | 110 | 110 | 105 | 105 |

The following substances were used as the components shown in Tables 4 to 7.

NR: Natural rubber (STR 20, manufactured by Von Bundit Co., Ltd.; glass transition temperature: −65° C.)

BR: Polybutadiene rubber (Nipol BR1220, manufactured by Zeon Corporation; glass transition temperature: −110° C.)

Carbon black: Show Black N339 (manufactured by Cabot Japan K.K.)

Silica: ULTRASIL VN3 (manufactured by Evonik Degussa)

Silane coupling agent: Silane coupling agent (Si69, manufactured by Evonik Degussa)

Fibrillated fiber-dispersed and microparticle-containing crosslinked bodies 1 to 4: Crosslinked bodies produced as described above Fibrillated fiber-dispersed and microparticle-containing crosslinkable polymers 1, 4, 5, 7 to 9, 11, and 13: Crosslinkable polymers produced as described above Fibrillated fiber-dispersed and microparticle-free crosslinkable polymer 2: Crosslinkable polymer produced as described above Fibrillated fiber-nondispersed and microparticle-containing crosslinkable polymer 10: Crosslinkable polymer produced as described above Zinc oxide: Zinc Oxide #3 (manufactured by Seido Chemical Industry Co., Ltd.)

Stearic acid: Beads stearic acid YR (manufactured by Nippon Oil & Fats Co., Ltd.)

Anti-aging agent: Amine-based anti-aging agent (Santflex 6PPD, manufactured by Flexsys)

Wax: Paraffin wax (manufactured by Ouchi Shinko Chemical Industrial Co., Ltd.)

Oil: Aroma oil (Extract 4S, manufactured by Showa Shell Sekiyu K.K.)

Sulfur: 5% Oil-treated sulfur (manufactured by Hosoi Chemical Industry Co., Ltd.)

Vulcanization accelerator: Sulfenamide-based vulcanization accelerator (Sanceller CM-G, manufactured by Sanshin Chemical Industry Co., Ltd.)

As is clear from the results shown in Table 4, both Working Examples 11 and 12, which were prepared by compounding predetermined amounts of the microparticles (E) and the fibrillated fiber (D) in the crosslinkable component (C), enhanced the friction performance on ice and the wear resistance, particularly had excellent balance between the friction performance on ice and the wear resistance, and particularly had excellent balance between the friction performance on ice and the frictional resistance of the tire, compared to those of Comparative Example 13. In particular, it was found that Working Example 12, which used the microparticles (E) formed by three-dimensionally crosslinking in advance the oligomer or polymer (e1) that is not miscible with the crosslinkable component (C) in the crosslinkable component (C), exhibited even better friction performance on ice. Furthermore, Working Example 22, which was prepared by compounding a predetermined amount of the crosslinkable component (C) and no microparticles (E), enhanced the friction performance on ice and the wear resistance and had excellent balance between the friction performance on ice and the wear resistance compared to Comparative Example 13.

As is clear from the results shown in Table 5, Working Examples 13 and 14, in which the content of the microparticles (E) was from 0.1 to 12 mass %, maintained excellent wear resistance that was at or beyond the level of Comparative Example 13, enhanced the friction performance on ice, and particularly had excellent balance between the friction performance on ice and the frictional resistance of the tire.

As is clear from the results shown in Table 6, Comparative Example 15, in which the content of the fibrillated fiber (D) was greater than 10 mass % of the crosslinkable component (C), and Comparative Example 16, which was prepared without dispersing the fibrillated fiber (D) in advance in the crosslinkable component (C), exhibited poor wear resistance and failed to enhance the friction performance on ice beyond the level of Comparative Example 13.

On the other hand, Working Examples 15 to 17, in which the content of the fibrillated fiber (D) was from 0.1 to 10 mass % of the crosslinkable component (C) and which were prepared by dispersing the fibrillated fiber (D) in advance in the crosslinkable component (C), maintained excellent wear resistance that was at or beyond the level of Comparative Example 13, enhanced the friction performance on ice, and particularly had excellent balance between the friction performance on ice and the frictional resistance of the tire.

As is clear from the results shown in Table 7, Working Examples 18 to 21, in which the average particle diameter of the microparticles (E) was from 0.1 to 100 μm, enhanced both the friction performance on ice and the wear resistance, and particularly had excellent balance between the friction performance on ice and the frictional resistance of the tire, compared to those of Comparative Example 13.

Note that, in Working Examples 11 to 22 which were prepared by dispersing the fibrillated fiber (D) in advance in the crosslinkable component (C), it was confirmed by component analysis that the fibrillated fiber (D) was not dispersed in the diene rubber (A).

The rubber composition for a tire and a studless tire of the present technology have been described in detail above. However, the present technology is not limited to the embodiments described above, but may be improved or modified in various ways within the scope of the present technology.

The invention claimed is:

1. A rubber composition for a tire comprising:
   100 parts by mass of a diene rubber (A) comprising a natural rubber and/or polybutadiene rubber;
   from 30 to 100 parts by mass of a filler (B); and
   a fibrillated fiber-dispersed cured crosslinked body comprising from 0.3 to 30 parts by mass of a crosslinkable component (C) that is not miscible with the diene rubber (A) and a fibrillated fiber (D) that is dispersed in the crosslinkable component (C) in a proportion of 0.1 to 10 mass % of the crosslinkable component (C), the crosslinkable component (C) being a polyether-based polymer or copolymer having, in a molecule, at least one reactive functional group bonded by a covalent bond selected from the group consisting of an urethane bond, urea bond, amide bond, imino bond, ketone bond, and ester bond, and the reactive functional group is at least one functional group selected from the group consisting of a hydroxy group, silane functional group, isocyanate group, (meth)acryloyl group, allyl group, carboxy group, acid anhydride group, and epoxy group.

2. The rubber composition for a tire according to claim 1, wherein the crosslinkable component (C) contains an alkylene oxide monomer unit in a main chain.

3. The rubber composition for a tire according to claim 1, wherein the crosslinkable component (C) contains a propylene oxide monomer unit in a main chain.

4. The rubber composition for a tire according to claim 1, wherein the rubber composition is formed by kneading the fibrillated fiber-dispersed cured crosslinked body with the diene rubber (A) and the filler (B) in a condition that does not allow the reactive functional group to react.

5. The rubber composition for a tire according to claim 1, wherein the rubber composition is formed by allowing at least a part of the reactive functional group to react, and then kneading the fibrillated fiber-dispersed cured crosslinked body with the diene rubber (A) and the filler (B).

6. The rubber composition for a tire according to claim 1, wherein the filler (B) is carbon black having a nitrogen adsorption specific surface area of 50 to 150 m²/g and/or a white filler having a CTAB adsorption specific surface area of 50 to 300 m²/g.

7. The rubber composition for a tire according to claim 1, the rubber composition further comprising from 1 to 15 parts by mass of thermally expanding microcapsules formed from thermoplastic resin particles containing a substance that vaporizes or expands to generate a gas by heat, per 100 parts by mass of the diene rubber (A).

8. The rubber composition for a tire according to claim 1, the rubber composition further comprising from 0.05 to 12 parts by mass of microparticles (E) that are three-dimensionally crosslinked and that have an average particle diameter of 0.1 to 100 μm, wherein
   the microparticles (E) are microparticles, in which an oligomer or polymer (e1) that is not miscible with the crosslinkable component (C) is three-dimensionally crosslinked.

9. The rubber composition for a tire according to claim 8, wherein the oligomer or polymer (e1) is a polycarbonate-based, aliphatic-based, saturated hydrocarbon-based, acrylic-based, or plant-derived polymer or copolymer.

10. The rubber composition for a tire according to claim 8, wherein the crosslinkable component (C) has at least one reactive functional group selected from the group consisting of a hydroxy group, silane functional group, isocyanate group, (meth)acryloyl group, allyl group, carboxy group, acid anhydride group, and epoxy group.

11. The rubber composition for a tire according to claim 8, wherein the oligomer or polymer (e1) is different from a reactive functional group contained in the crosslinkable component (C) and contains at least one reactive functional group selected from the group consisting of a hydroxy group, silane functional group, isocyanate group, (meth)acryloyl group, allyl group, carboxy group, acid anhydride group, and epoxy group that does not react with the at least one reactive functional group contained in the crosslinkable component (C); and
   the microparticles (E) are microparticles formed by three-dimensionally crosslinking using the at least one reactive functional group contained in the oligomer or polymer (e1) in the crosslinkable component (C).

12. The rubber composition for a tire according to claim 8, wherein the microparticles (E) are microparticles that are three-dimensionally crosslinked by reacting the oligomer or polymer (e1) with at least one type of component (e2) selected from a group consisting of water, a catalyst, and a compound having a functional group that reacts with a reactive functional group of the oligomer or polymer (e1).

13. The rubber composition for a tire according to claim 12, wherein the compound (e2) is at least one compound selected from the group consisting of a hydroxy group-containing compound, silanol compound, hydrosilane compound, diisocyanate compound, amine compound, oxazolidine compound, enamine compound, and ketimine compound.

14. The rubber composition for a tire according to claim 8, wherein the rubber composition is formed by dispersing the microparticles (E), in which the oligomer or polymer (e1) is three-dimensionally crosslinked, and the fibrillated fiber (D) in the crosslinkable component (C) and then kneading the crosslinkable component (C) containing the microparticles (E) and the fibrillated fiber (D) with the diene rubber (A) and the filler (B) in a condition that does not allow a reactive functional group to react.

15. The rubber composition for a tire according to claim 8, wherein the rubber composition is formed by dispersing the microparticles (E), in which the oligomer or polymer (e1) is three-dimensionally crosslinked, and the fibrillated fiber (D) in the crosslinkable component (C), allowing at least a part of a reactive functional group of the crosslinkable component (C) containing the microparticles (E) and the fibrillated fiber (D) to react, and then kneading the crosslinkable component (C) with the diene rubber (A) and the filler (B).

16. The rubber composition for a tire according to claim 8, wherein the microparticles (E) are microparticles in which the oligomer or polymer (e1) that is not miscible with the crosslinkable component (C) is three-dimensionally crosslinked in advance in the crosslinkable component (C).

17. The rubber composition for a tire according to claim 8, wherein an average particle diameter of the microparticles (E) is from 1 to 50 μm.

18. The rubber composition for a tire according to claim 1, wherein the fibrillated fiber (D) is at least one type selected from a group consisting of a natural fiber, synthetic fiber, plant-derived fiber, animal-derived fiber, and mineral-derived fiber, and has an average fiber length of 1 to 1,000 μm and an average fiber diameter of 0.01 to 1 μm.

19. The rubber composition for tire according to claim 1, wherein an average glass transition temperature of the diene rubber (A) is −50° C. or lower.

20. A studless tire comprising a tire tread portion formed from the rubber composition for a tire described in claim 1.

21. The rubber composition for a tire according to claim 1, wherein the fibrillated fiber (D) is at least one type selected from a group consisting of an animal-derived fiber and a mineral-derived fiber.

22. The rubber composition for a tire according to claim 1, wherein the diene rubber (A) consists of the natural rubber and the polybutadiene rubber in equal amounts.

* * * * *